US009672567B2

(12) United States Patent
Thomas et al.

(10) Patent No.: US 9,672,567 B2
(45) Date of Patent: Jun. 6, 2017

(54) DAMAGE ASSESSMENT AND REPORTING SYSTEM

(71) Applicant: Estimatics in the Fourth Dimensions, LLC, Cincinnati, OH (US)

(72) Inventors: Douglas Thomas, Cincinnati, OH (US); Steven D. Thomas, Cincinnati, OH (US); William J. Durel, Lafayette, LA (US)

(73) Assignee: ESTIMATICS IN THE FOURTH DIMENSIONS, LLC, Cincinnati, OH (US)

(*) Notice: Subject to any disclaimer, the term of this patent is extended or adjusted under 35 U.S.C. 154(b) by 446 days.

(21) Appl. No.: 14/261,032

(22) Filed: Apr. 24, 2014

(65) Prior Publication Data
US 2014/0288976 A1 Sep. 25, 2014

Related U.S. Application Data

(63) Continuation-in-part of application No. 13/931,892, filed on Jun. 29, 2013, now abandoned.

(60) Provisional application No. 61/665,983, filed on Jun. 29, 2012.

(51) Int. Cl.
*G06Q 40/08* (2012.01)
*G06Q 10/10* (2012.01)
*G06T 7/60* (2017.01)
*G06T 11/60* (2006.01)
*G06Q 20/00* (2012.01)

(52) U.S. Cl.
CPC ............ *G06Q 40/08* (2013.01); *G06Q 10/10* (2013.01); *G06T 7/60* (2013.01); *G06T 11/60* (2013.01); *G06T 2207/20096* (2013.01)

(58) Field of Classification Search
CPC ............................. G06Q 40/08; G06Q 90/00
USPC ................................................. 705/4; 701/29
See application file for complete search history.

(56) References Cited

U.S. PATENT DOCUMENTS

| | | | |
|---|---|---|---|
| 9,448,689 B2* | 9/2016 | Sakamoto | H04N 17/002 |
| 2006/0222263 A1* | 10/2006 | Carlson | 382/287 |
| 2007/0288135 A1* | 12/2007 | Kidd | G01M 17/0078 701/31.4 |
| 2009/0265193 A1* | 10/2009 | Collins | G06Q 30/0185 705/4 |
| 2012/0223965 A1* | 9/2012 | Pershing | 345/630 |

(Continued)

Primary Examiner — Kito R Robinson
Assistant Examiner — Irene Kang
(74) Attorney, Agent, or Firm — Ted M. Anthony

(57) ABSTRACT

Rooms, structures, vehicles, and other objects can be accurately diagrammed, often without performing a physical on-site inspection. Photographs of a room, structure, vehicle, or other object are uploaded to a computer having a processor. A base calibration measure is determined for a room, structure, vehicle, object, or component thereof, depicted in the photographs using at least one known dimension for items observable in the photographs. The base calibration measure is then used to determine dimensions of other areas, items, or objects depicted in such photographs, and to create at least one scale diagram of the subject matter of the photographs. Damages areas of the structure/vehicle/object can be assessed from the scale diagram. The scale diagram can then be used to calculate appropriate insurance payment amounts for damage claims.

2 Claims, 17 Drawing Sheets

(56) References Cited

U.S. PATENT DOCUMENTS

2013/0226624 A1\* 8/2013 Blessman ............. H04N 7/181
  705/4
2014/0098211 A1\* 4/2014 Yahav ................. G03F 7/70616
  348/79

\* cited by examiner

DAMAGE ASSESSMENT AND REPORTING SYSTEM

CROSS-REFERENCE TO RELATED APPLICATIONS

The present application is a continuation-in-part to application Ser. No. 13/931,892, titled "METHOD FOR EFFICIENT PROCESSING OF INSURANCE CLAIMS," filed on Jun. 29, 2013, which claims priority to provisional patent application Ser. No. 61/665,983, titled "METHOD AND APPARATUS FOR EFFICIENT INSURANCE CLAIM ADJUSTING," filed on Jun. 29, 2012.

TECHNICAL FIELD

The technology disclosed herein relates generally to a system for generating scale diagrams of an area, structure, or object using photographs and is particularly directed to computerized system of the type which uses scale diagrams generated from photographs to efficiently process loss claims including, without limitation, casualty insurance claims.

STATEMENT REGARDING FEDERALLY SPONSORED RESEARCH OR DEVELOPMENT

None.

BACKGROUND

Many insured property damage claims require a physical inspection by at least one adjuster. Such adjusters, who are frequently employees or contractors of an insurance provider, physically inspect insured property in order to assess damages and process applicable insurance claims. Many insurance providers have so-called "fast track" claims which allow for processing of property damage claims without conducting on-site inspections. However, such fast track claims are typically processed without significant information regarding the property at issue, as well as the nature and extent of the alleged damages. As a result, such existing fast track claims are typically highly vulnerable to inaccuracies and/or inequities in the claims adjustment process. Moreover, such fast track claims currently represent a fairly small percentage of property damage insurance claims.

Every on-site inspection has inherent costs, whether such inspection is performed by an insurance company employee or a third-party contractor. Such costs can include direct expenses, such as adjustor salaries or contractor fees. However, such inspection costs can also include other expenses, such as vehicle, fuel, maintenance, vacation and benefit costs, as well as workers compensation insurance. Physical inspections also expose company and contract adjustors to a risk of personal injury or death, particularly at property locations that have suffered significant damage.

Physical inspections, which are also time consuming and labor intensive, can also substantially delay the claim adjusting process. Such delay is especially common during times of higher claims volume, such as following extreme weather events or natural disasters when multiple property locations are damaged or destroyed. This delay can have a detrimental effect on customer service and customer satisfaction.

Thus, there is a need for an improved system for processing property loss/casualty claims that increases efficiency and lowers costs. The method should provide information to allow an insurer to determine whether an on-site physical inspection is required. In cases where such physical inspection is not required, the improved system for processing property loss/casualty claims should permit generation of scale diagrams of an area, structure, or object using photographs, as well as the use of such scale diagrams in connection with the claim processing procedure.

SUMMARY

The technology disclosed herein significantly increases the number of "fast track" loss/casualty claims (while reducing costs associated with inspection claims), while maintaining the integrity of the claim adjusting process. Furthermore, the technology disclosed herein can substantially speed up the claims adjusting process, while improving customer service, customer involvement and overall satisfaction. Additionally, the technology disclosed herein can be used by both inside adjusters and field adjusters.

The technology disclosed herein allows inside adjusters to accurately diagram rooms, structures and objects without performing a physical on-site inspection by using photographs, including photographs submitted via email or over the internet. Such photographs can be provided by a property owner (or other source) and used by an inside adjustor to process a claim without the need for physically inspecting a location.

Even when on-site inspection is required, the technology disclosed herein allows field adjusters to expedite the inspection process by eliminating the need for diagramming a property while actually on location, thereby allowing an adjustor to inspect more properties during a given time period. Such efficiency is particularly important during times of higher claims volume, such as following extreme weather or natural disasters when multiple property locations are damaged or destroyed by a common event. The technology disclosed herein also improves safety by reducing the amount of time that a field adjustor is required to remain on-site at a damaged location.

In accordance with the technology disclosed herein, photographs of a damaged property are initially obtained. Where possible, such photographs can be taken by a property owner or other person acting on behalf of said property owner. However, it is to be observed that in certain circumstances, an adjustor or other inspector may be required to travel to a location in order to obtain such photographs.

Once obtained, such photographs can be sent to a claim processing facility, whether by physical delivery, electronic mail, internet submission, or other method. In many cases, such photographs are organized by room, structure or object in question. Such photographs are then uploaded to a computer having a processor; when only printed copies of photographs are provided, such photographs can be scanned or otherwise digitized in order to facilitate such uploading process.

After such photographs have been uploaded to a computer having a processor, a base calibration measure is obtained for a particular room, structure, object or component thereof depicted in such photographs using at least one known dimension for items observable in such photographs. Although such known dimensions can be obtained from any number of different sources, in the preferred embodiment said known dimensions are obtained from standards existing for particular items. By way of illustration, but not limitation, such standard dimensions can be obtained from building codes (or other rules or regulations established by applicable governmental or regulatory agencies), manufacturer specifications, manufacturing standards, or other sources. For example, such standard dimensions can include, without limitation, door heights, bricks, kitchen sinks, furniture items and the like.

After said base calibration measure has been determined using said at least one known dimension, said base calibration measure can then be used to determine dimensions of other areas, items or objects depicted in such photographs. Thereafter, said dimensions can be utilized to create at least one scale diagram of a room, area, structure or object in question. In additional to diagramming a room, areas, structure or object, visible or known damaged areas, surfaces and/or materials can be measured in order to determine the extent of repairs or replacement required.

Such scale diagrams can then be used to calculate an appropriate insurance payment amount. Frequently, such scale diagrams can be uploaded into conventional estimating computer software commonly used to calculate insurance payments well known to those having skill in the art of adjusting property damage claims. By way of example, such conventional estimating software can include, without limitation, commercially available estimating software marketed under the trademarks "Xactimate" or "Symbility", or such other software as may provide desired output information. Where applicable, deductions for openings (windows, doors, missing walls) and other features associated with said rooms, structures or other objects depicted in such scale diagrams can be taken into account when calculating such insurance payment.

Although the technology disclosed herein is described herein primarily in connection with the processing of insurance claims, it is to be observed that the technology disclosed herein has utility in a wide range of other applications and/or industries. For example, the present technology can benefit non-insurance applications including, without limitation, real estate, interior design, remodeling/reconstruction, security and other industries that require or can utilize scale diagrams of areas, structures or other objects.

It is an advantage of the technology disclosed herein to provide a computerized system that allows photographs of damaged structures to be sent to a claims representative of an insurance company, and to have a claims representative or other employee of an insurance company use operating software to manipulate the photographic data to discern with good accuracy the amount of damaged areas and the amount of original un-damaged areas of a structure such as a dwelling or a vehicle, to quickly and accurately create damage estimates used in handling insurance claims.

It is another advantage of the technology disclosed herein to provide an E4thD processing center that receives photographic information from an insured person or from a claims representative, to manipulate the photographic data to create accurate damage assessments for structures that are insured, and to contact insurance company computer centers to create accurate insurance claims for those damaged structures.

It is a further advantage of the technology disclosed herein to provide operating software that can be used by a claims representative that will receive photographic information and create accurate damage estimates for damaged structures, and that can be used to contact insurance companies to create claims that can be quickly settled by a claims adjuster using the accurate information gleaned from the photographic information.

It yet another advantage of the technology disclosed herein to provide E4thD operating software that can be used at an insurance company's computing center, such that photographic information can be received from insured persons or from claims representatives, in which that photographic information can be used to quickly and accurately create damage estimates that will allow the insurance company to quickly settle claims for such damaged structures.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a computerized system for determining physical attributes of a physical structure is provided, which comprises: (a) a processing circuit; (b) a memory circuit; (c) a communications circuit; (d) a visual monitor; (e) a user-controlled data entry device; wherein: the processing circuit is configured: (f) to receive photographic information through the communications circuit; (g) to display, on the visual monitor, an image based on the photographic information, the image containing image data; (h) to allow a user, while viewing the image: (i) to select an object, using the data entry device, that is contained in the image; (ii) to graphically draw a first line that corresponds to a particular dimension of the object, the first line having a first distance as its length on the visual monitor, which is then used as a base calibration measure; (iii) to store the first distance in the memory circuit, in units of GUI coordinate data; (iv) to graphically change the length of the first line so that it becomes a second line having a second distance as its length, the second distance spanning a different particular dimension on the image; (v) to store the second distance in the memory circuit, in units of GUI coordinate data; (vi) to assign an actual distance in engineering units to the base calibration measure, and to store the actual distance in the memory circuit; (i) to convert distances that initially are in terms of units of GUI coordinate data into distances that are in terms of engineering units; and (j) to automatically scale the second distance into engineering units.

In accordance with another aspect, a computerized system for determining physical attributes of a physical structure is provided, which comprises: (a) a processing circuit; (b) a memory circuit; (c) a communications circuit; (d) a visual monitor; (e) a user-controlled data entry device; wherein: the processing circuit is configured: (f) to receive photographic information through the communications circuit; (g) to display, on the visual monitor, an image based on the photographic information, the image containing image data; (h) to allow a user, while viewing the image: (i) to select an object, using the data entry device, that is contained in the image; (ii) to graphically draw a first line that corresponds to a particular dimension of the object, the first line having a first distance as its length on the visual monitor, which is then used as a base calibration measure; (iii) to store the first distance in the memory circuit, in units of GUI coordinate data; (iv) to graphically draw a second line having a second distance as its length, the second distance spanning a different particular dimension on the image; (v) to store the second distance in the memory circuit, in units of GUI coordinate data; (vi) to assign an actual distance in engineering units to the base calibration measure, and to store the actual distance in the memory circuit; (i) to convert distances that initially are in terms of units of GUI coordinate data into distances that are in terms of engineering units; and (j) to automatically scale the second distance into engineering units.

In accordance with a further aspect, a computerized system for determining physical attributes of a physical structure is provided, which comprises: (a) a first computerized device, comprising: (i) a first processing circuit; (ii)

a first memory circuit; (iii) a first communications circuit; (iv) a first display device; (v) a first user-controlled data entry device; (vi) at least one of: (A) a camera, and (B) an optical scanner; (vii) a first computer program that executes on the first processing circuit; (b) a second computerized device, comprising: (i) a second processing circuit; (ii) a second memory circuit; (iii) a second communications circuit; (iv) a second display device; (v) a second user-controlled data entry device; (vi) a second computer program that executes on the second processing circuit; (c) a third computerized device, comprising: (i) a third processing circuit; (ii) a third memory circuit; (iii) a third communications circuit; (iv) a third display device; (v) a third user-controlled data entry device; (vi) a third computer program that executes on the third processing circuit; (d) at least one communications network that allows the first, second, and third communications circuits to transfer data to and from external computer devices; wherein: (e) the first processing circuit, executing the first computer program, is configured: (i) to cause image data received at the first communications circuit, from the at least one of a camera and a scanner, under control of a first user, to be stored in the first memory circuit; (ii) to transmit the image data, using the first communications circuit, to the second computerized device; (f) the second processing circuit, executing the second computer program, is configured: (i) to cause the image data received at the second communications circuit, from the first computerized device, to be stored in the second memory circuit; (ii) to allow a second user: (A) to view the image data on the second display device; (B) to graphically draw a first line that corresponds to a particular dimension of an object, as selected by the second user, that appears in the image data, and thereafter use the first line as a base calibration measure; (C) to store the base calibration measure in the second memory circuit; (D) to graphically draw a second line having a second distance as its length, the second distance spanning a different particular dimension on the image data, as selected by the second user; (E) to assign an actual distance in engineering units to the base calibration measure, and to convert the second distance that initially was in terms of units of GUI coordinate data into a distance that is in terms of engineering units; (F) to automatically scale the entire image, in units of GUI coordinate data, into engineering units, and thereby create a scale diagram; (G) to select a first area that corresponds to a total area of a specific structure that appears in the image, using the second user-controlled data entry device; (H) to select a second area that corresponds to at least one area of damage that is visible in the image, using the second user-controlled data entry device; (iii) to calculate the first area in terms of engineering units, to calculate the second area in terms of engineering units, and to store results of the first area and second area calculations in the second memory circuit; (iv) to transmit the results, using the second communications circuit, to the third computerized device; and (e) the third processing circuit, executing the third computer program, is configured: (i) to cause the results received at the third communications circuit, from the second computerized device, to be stored in third second memory circuit; (ii) to allow a third user: (A) to review the results to identify an insured property; (B) to inspect information about the insured property that is stored in the third memory circuit, to determine a value of the insured property; and (C) to use the results to assess a damage value of the at least one area of damage.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The foregoing summary, as well as any detailed description of the preferred embodiments, is better understood when read in conjunction with the drawings and figures contained herein. For the purpose of illustrating the technology disclosed herein, the drawings and figures show certain preferred embodiments. It is understood, however, that the technology is not limited to the specific methods and devices disclosed in such drawings or figures.

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
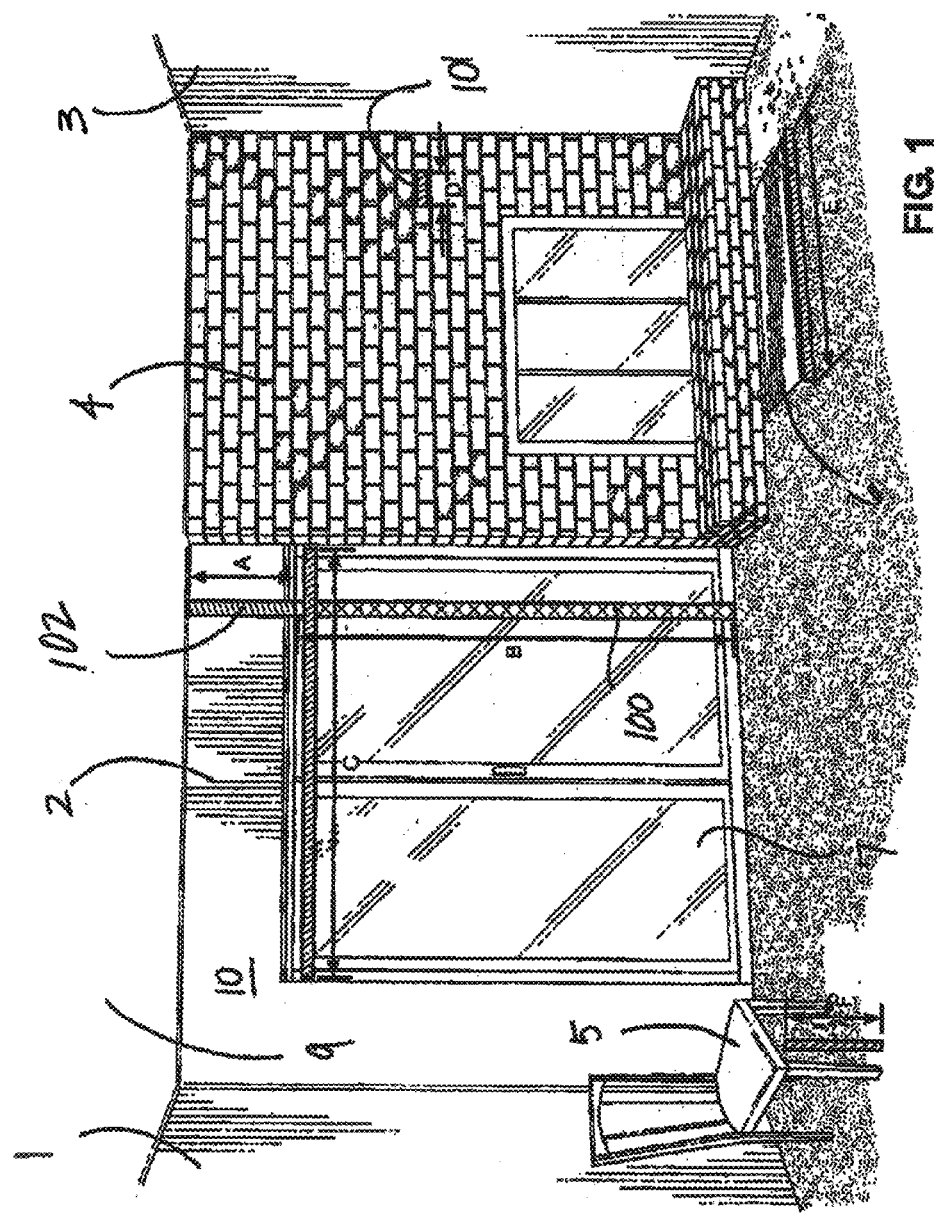
FIG. 1 depicts a digital image of a photograph showing a perspective view of an internal space of a structure that can be diagrammed using the method of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Upon notice of the existence of a claim to be processed, an initial determination is made regarding whether an on-site inspection is required. If so, then an inspector can be dispatched to the location of the property at issue. If not, then the claim can be classified as a so-called "fast track" claim and handled accordingly.

In accordance with the technology disclosed herein, photographs of a damaged property are initially obtained. For "fast track" claims, specific instructions can be provided to a claimant, property owner, tenant or other interested party regarding certain actions to be taken including, without limitation, instructions regarding how to photograph the property at issue, label such photographs, and submit such photographs for further handling. In many case, such photographs (whether digital photos, or scanned or digitized images) can be sent by electronic mail or uploaded to a web site or other portal accessible via the Internet.

When physical inspection is performed, a field adjuster or inspector can visit the property that is the subject of the claim. Said field adjustor or inspector can then photograph the property that is subject to the claims (frequently pursuant to a method that is similar to the instructions provided to claimants, property owners, tenants or other interested parties using "fast track" claim processing). Said field adjuster or inspector can also takes notes on damages or other observed conditions (commonly referred to in the insurance industry as a "tic sheet") and/or gather such other information from the location as deemed advisable under the circumstances.

Regardless of how obtained (whether from an inspector or adjuster, or from a claimant, property owner or tenant) such photographs are uploaded or otherwise imported to a computer having a processor. Such photographs can be beneficially organized by room, structure or object in question, or other desirable classification scheme.

After such photographs have been uploaded or otherwise imported to a computer having a processor, one or more digital images can be displayed via a computer monitor or other graphic interface. In the preferred embodiment, said digital images depict substantially the same view as said photographs; however, it is to be observed that said digital images can be zoomed, enhanced or otherwise digitally manipulated using means well known to those having skill in the art. A base calibration measure is obtained for each particular room, structure, object or component thereof depicted in such photographs using at least one known dimension for items observable in such photographs.

Referring now to the drawings, in a first embodiment FIG. 1 depicts digital image of a photograph of a perspective view of an internal space of a structure 10 that can be diagrammed using the method of the technology disclosed herein. As depicted in FIG. 1, structure 10 generally comprises walls 1, 2 and 3, and ceiling 9. Said structure further includes a brick hearth and fireplace 4, chair 5, rug 6 and doorway 7.

A base calibration measure is generated by digitally (graphically) drawing a line on said digital image using a computer and software of the technology disclosed herein. By way of illustration, and as depicted in FIG. 1, line 100 can be graphically drawn from the floor at the bottom of doorway 7 to the top of doorway 7. Said line 100 is assigned a length dimension—depicted as dimension "B" on FIG. 1—based upon a known standard of the height of doorway 7. For example, said calibration line 100 can be assigned a length dimension of 6'8" (based on standard doorway height as set forth in an applicable local building code), with digital calibration line 100 being scaled accordingly.

Although such known dimensions can be obtained from any number of different sources, in the preferred embodiment said known dimensions are obtained from standards existing for particular items. By way of illustration, but not limitation, such standard dimensions can be obtained from building codes (or other rules or regulations established by applicable governmental or regulatory agencies), manufacturer specifications, or other sources. For example, such standard dimensions can include, without limitation, door heights, bricks, kitchen sinks, furniture items and the like. In the preferred embodiment, one or more databases can be created for such known standards, which standards can be obtained from a variety of sources.

Still referring to FIG. 1, said base calibration dimension B (and the associated scale of line 100) can be confirmed using other known standards observable within said digital image of said photograph. For example, a line 101 can be graphically drawn on said digital image to correspond to the width of a brick in hearth/fireplace 4 and assigned dimension "D" (for example, 7½"). Similarly, lines can be graphically drawn on said digital image to correspond to other known dimensions, such as a line 102 representing the height of chair 5 (dimension "F"), a line 103 representing the width of doorway 7 (dimension "C") and a line 104 representing the width of rug 6 (dimension "E"). In this manner, base calibration dimension B can be confirmed by comparison to said other known dimensions C, D, E and F, and adjusted if required, based on such other dimensions (or other known dimensions measured from said image) to represent the most accurate base calibration dimension B and applicable scale for line 100.

Base calibration line 100 having dimension B is fixed for use with said image, with said dimension B being displayed on said digital image depicted in FIG. 1. After line 100 is fixed in length, it can be graphically moved, turned and/or otherwise repositioned on such image, as desired, in order to determine the dimensions of other unknown items in FIG. 1. For example, calibration line 100 can be graphically placed in a desired position, such as the opening of doorway 7 on FIG. 1. A first end of said line 100 can be graphically anchored on the floor at the base of doorway 7, while the second end of said line 100 can be "stretched" to the intersection of wall 2 and ceiling 9, thereby forming a stretch line 105 having dimension "A". In the preferred embodiment, line 100 does not change in length; rather, stretch line 105 is displayed as a different color extending from the second end of calibration line 100 in order to graphically represent the additional length of line 105 (and dimension A) relative to line 100 (and dimension B).

Dimension A can be determined using the length of line 105 and the scale established by said base calibration line 100 and known dimension B. Thereafter, the height of said wall 2 (that is, the distance from the floor to the intersection of wall 2 and ceiling 9) can be determined as the sum of dimensions A and B. Similarly, other unknown dimensions can be calculated from said photographic image in substantially the same manner using said base calibration line 100 and dimension B. Specifically, line 100 can be graphically moved, turned and/or otherwise repositioned on such image (and then anchored, and stretched/compressed), to determine other unknown dimensions depicted on said photographic image.

In the preferred embodiment, when an item or object larger than dimension B is being measured on the image of FIG. 1, a stretch line is displayed as a different color extending from the non-anchored end of calibration line 100 in order to graphically represent the additional or incremental length of said stretch line relative to said calibration line 100. Conversely, when an item or object smaller than line 100 or dimension B is being measured on the image of FIG. 1, a parallel "subtraction line" is graphically displayed adjacent to said calibration line in a different color than line 100; said subtraction line graphically represents the reduction in length of the measured item/object compared to the original length of calibration line 100.

Figure 2:
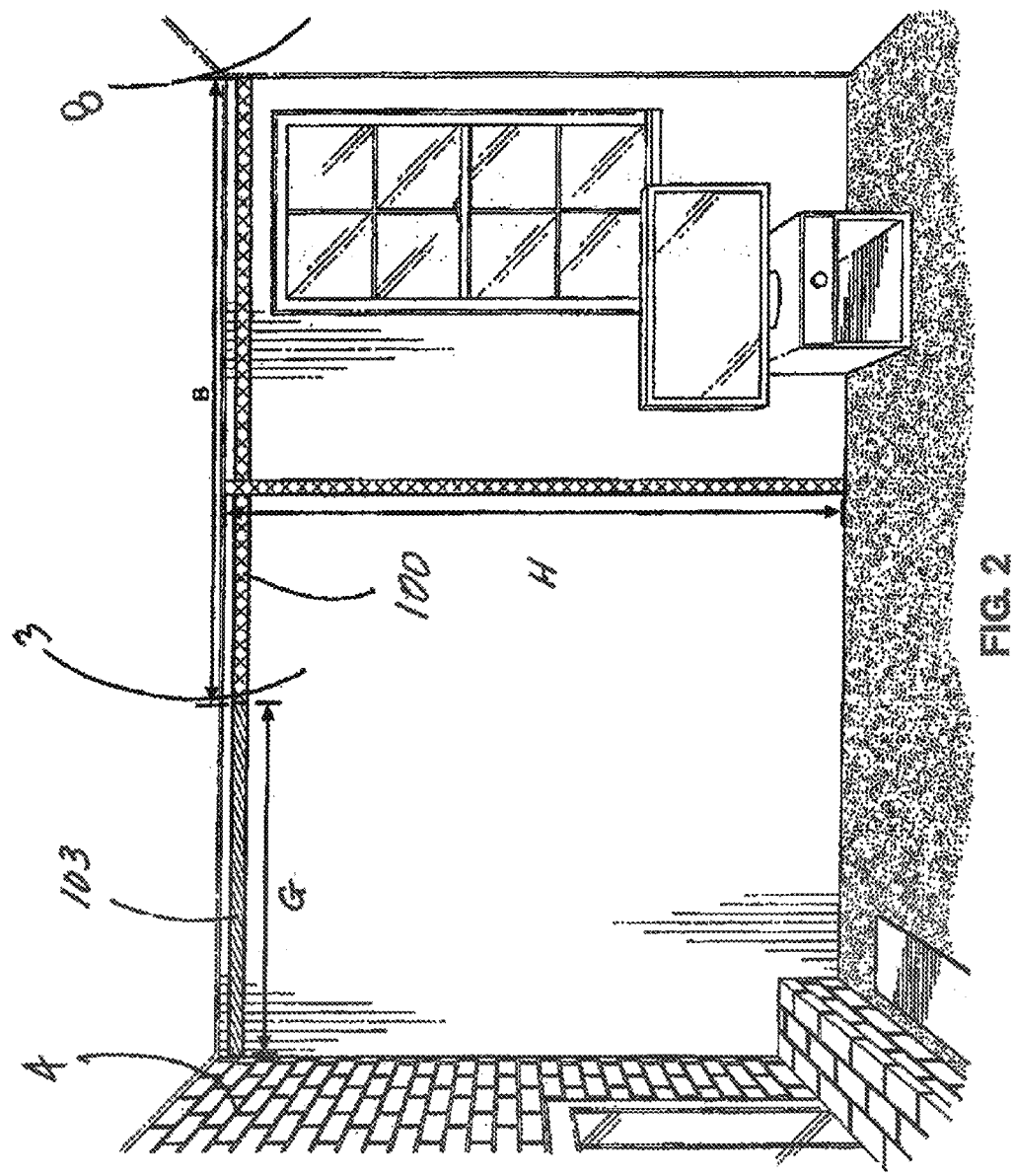
FIG. 2 depicts a digital image of a photograph showing an alternate perspective view of the internal space of a structure depicted in FIG. 1.

FIG. 2 depicts a digital image of an alternate perspective view of the internal space of a structure 10 depicted in FIG. 1 including, without limitation, wall 3, ceiling 9, rug 6 and hearth/fireplace 4. Put another way, FIG. 2 depicts another perspective of a different portion of a room depicted in FIG. 1. In FIG. 2, a new base calibration line 200 having a known distance is established on FIG. 2. Because the distance from floor to ceiling in the subject room was determined in FIG. 1 (as the sum of dimensions A and B), one end of new calibration line 200 can be anchored on the floor at the base of wall 3, while the other end of said line 200 can be stretched to the intersection of wall 3 and ceiling 9; this new calibration line 200 can then be assigned a known dimension "G" (equivalent to the sum of dimensions A and B determined in FIG. 1).

As with FIG. 1, fixed-length calibration line 200 having a base calibration dimension G can then be graphically moved, turned and/or otherwise repositioned (and then anchored, and stretched/compressed) on FIG. 2 to determine other unknown dimensions depicted on said photographic image. When an item or object larger than dimension G is being measured on the image of FIG. 2, a stretch line can be displayed as a different color extending from the non-anchored end of calibration line 200 in order to graphically represent the additional or incremental length of said stretch line relative to said calibration line 200. Conversely, when an item or object smaller than line 200 or dimension G is being measured on the image of FIG. 2, a parallel "subtraction line" is graphically displayed adjacent to said calibration line 200 in a different color than line 200; said subtraction line graphically represents the reduction in length of the smaller measured item/object compared to the original length of calibration line 200.

For example, a first end of said calibration line 200 can be graphically anchored at the intersection between walls 3 and 8, while the second end of said calibration line 200 can be graphically "stretched" to the intersection of wall 3 and hearth/fireplace 4, thereby forming a stretch line 201 having dimension "H". In the preferred embodiment, calibration line 200 does not change in length; rather, stretch line 201 is displayed as a different color extending from the second end of calibration line 200 in order to graphically represent the additional length of line 201 (and dimension H) relative to fixed calibration line 200 (and dimension G).

Figure 3:
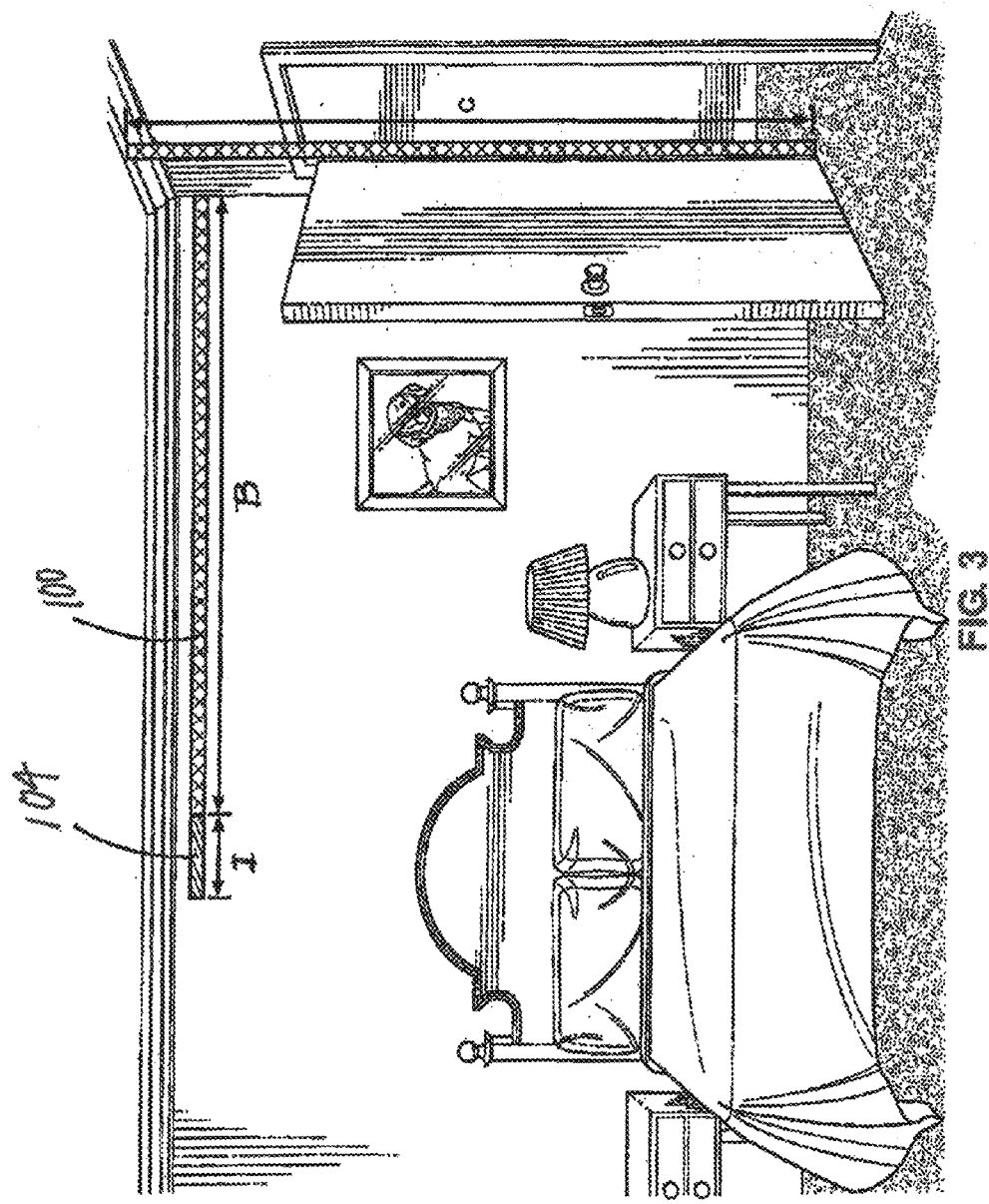
FIG. 3 depicts a digital image of a photograph showing a perspective view of a first portion of an internal space of a structure that can be diagrammed using the method of the technology disclosed herein.
Figure 4:
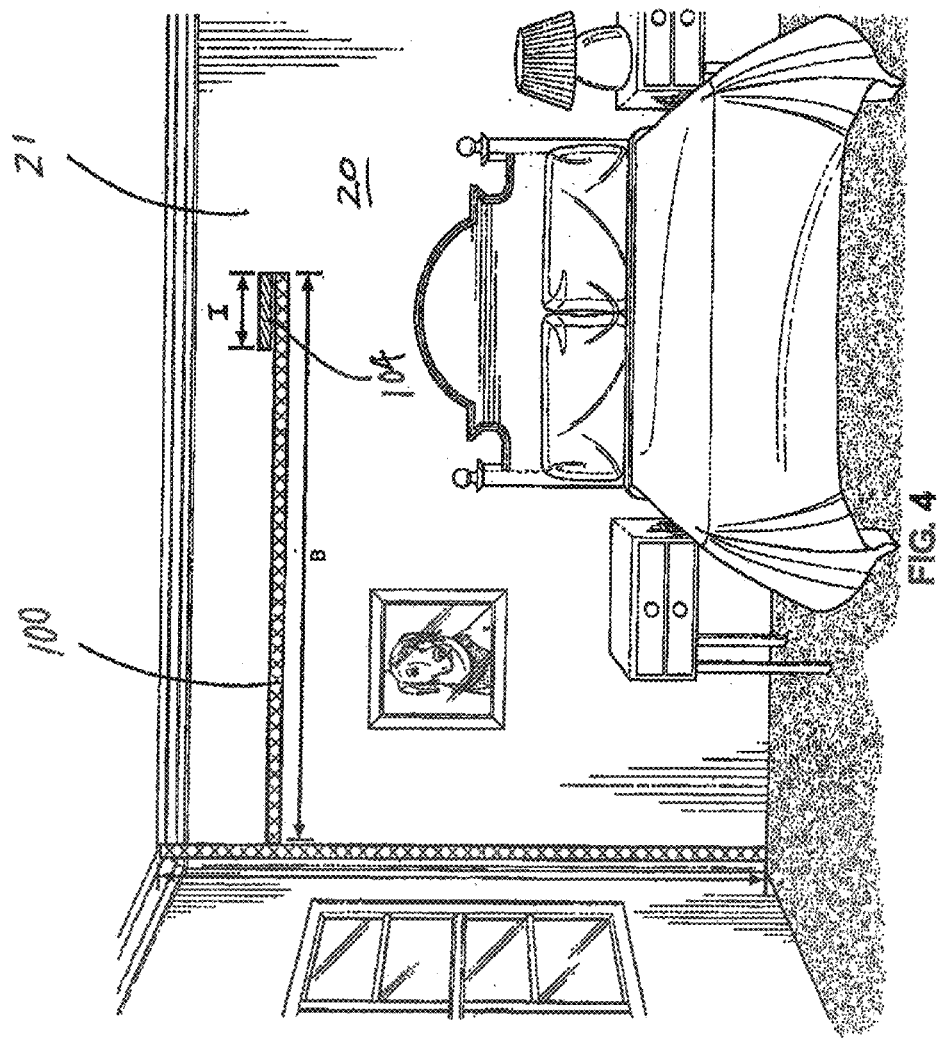
FIG. 4 depicts a digital image of a photograph of a perspective view of a second portion of an internal space of a structure depicted in FIG. 3.

On occasion, it may be necessary to utilize more than one photograph of the same basic area, structure or object due to the size of walls, structures or other objects being diagrammed. FIG. 3 depicts a digital image depicting a perspective view of a first portion of an internal space of a structure 30 having walls 31 and 32, door opening 33 formed in wall 32, ceiling 35 and bed 40. FIG. 4 depicts a digital image showing a perspective view of a second portion of said internal space of structure 30 depicted in FIG. 3; from the perspective of FIG. 4, structure 30 has walls 31 and 34, ceiling 35 and bed 40. It is to be observed that there is some overlap between the subject matter depicted in FIGS. 3 and 4.

A base calibration measure is generated for FIG. 3 by digitally (graphically) drawing a line on said digital image using a computer and software of the technology disclosed herein. By way of illustration, and as depicted in FIG. 3, line 300 can be graphically drawn from the floor at the bottom of door opening 33 to the top of said door opening 33. Said line 300 is assigned a length dimension—depicted as dimension "I" on FIG. 3—based upon a known standard of the height of door opening 33 as described previously. For example, said calibration line 300 can be assigned a length dimension of 6'8", with digital calibration line 300 being scaled accordingly.

Base calibration line 300 having dimension I is fixed for use with said image, with said dimension I being displayed on said digital image depicted in FIG. 3. After calibration line 300 is fixed in length, it can be graphically moved, turned and/or otherwise repositioned on such image, as desired, in order to determine the dimensions of other unknown items in FIG. 3. For example, a first end of said calibration line 300 can be graphically anchored on the floor at the base of door opening 33, while the second end of said line 300 can be "stretched" to the intersection of wall 32 and ceiling 35, thereby forming a stretch line 301 having dimension "J". In the preferred embodiment, line 300 does not change in length; rather, stretch line 301 is displayed as a different color extending from the second (upper) end of calibration line 300 in order to graphically represent the additional length of line 301 (and dimension J) relative to line 300 (and dimension I).

Similarly, a first end of said calibration line 300 can be graphically anchored at the intersection of walls 31 and 32, while the second end of said line 300 can be "stretched" to a selected reference point (such as the center of bed 40), thereby forming a stretch line 302 having dimension "K". In the preferred embodiment, line 300 does not change in length; rather, stretch line 302 is displayed as a different color extending from the non-anchored end of calibration line 300 in order to graphically represent the additional length of stretch line 302 (and dimension K) relative to line 300 (and dimension I).

In FIG. 4, a new base calibration line 400 having a known distance is established for FIG. 4. Because the distance from floor to ceiling in the subject room was determined in FIG. 3 (as the sum of dimensions I and J), one end of new calibration line 400 can be anchored on the floor at the base of wall 31, while the other end of said line 400 can be stretched to the intersection of wall 31 and ceiling 35; this new calibration line 400 can then be assigned a known dimension "L" (which equivalent to the sum of dimensions I and J as previously determined in FIG. 3).

As with the other figures, fixed-length calibration line 400 having a base calibration dimension I can then be graphically moved, turned and/or otherwise repositioned (and then anchored, and stretched/compressed) on FIG. 4 to determine other unknown dimensions depicted on said photographic image. For example, a first end of said calibration line 400 can be graphically anchored at the intersection between walls 31 and 34, while the second end of said calibration line 400 can be graphically moved to the previously determined reference point at the center of bed 40. Because the distance from wall 34 to said reference point (the center of bed 40) is less than dimension L of calibration line 400, subtraction line 401 graphically represents the differences in length between: (1) the distance from wall 34 to said reference point; and (2) the original length of calibration line 400.

Such linear dimensions determined in accordance herewith can then be used, on the applicable images, to determine areas (typically expressed as square footage) of doors, windows, missing walls and other areas (wainscoting) to be deducted. Additionally, unknown dimensions of other features such as, for example, wall coverings, paintings and/or other items, can also be calculated in this manner. Thereafter, said dimensions can be utilized to create at least one scale diagram of a room, structure or object in question.

Such scale diagrams can then be used to calculate appropriate insurance payment amounts. Frequently, such scale diagrams can be uploaded into conventional estimating computer software commonly used to calculate insurance payments well known to those having skill in the art of adjusting property damage claims. By way of example, such conventional estimating software can include, without limitation, commercially available estimating software marketed under the trademarks "Xactimate" or "Symbility", or such other software as may provide desired output information. Where applicable, deductions for openings (windows, doors, missing walls) and other features associated with said rooms, structures or other objects depicted in such scale diagrams can be taken into account when calculating such insurance payment.

In additional to diagramming rooms, areas, structures or objects, visible or known damaged areas, surfaces and/or materials can be measured in order to determine the extent of repairs or replacement required.

The above-described technology disclosed herein has a number of particular features that should preferably be employed in combination, although each is useful separately without departure from the scope of the technology disclosed herein. While the preferred embodiment of the technology disclosed herein is shown and described herein, it will be understood that the technology may be embodied otherwise than herein specifically illustrated or described, and that certain changes in form and arrangement of parts and the specific manner of practicing the technology disclosed herein may be made within the underlying idea or principles of that technology.

In the above description relating to FIGS. 1-4, a person is to take photographs of a damaged structure, such as a building or an automobile, for example. The person taking those photographs would typically be one who has property insured by an insurance company, or a claims representative who personally went to the site to take the photographs of the damaged property. In any event, those digital photographs will need to be uploaded to a computer system for processing. Therefore, the photographer needs to have a certain amount of computerized hardware, and the next several figures will describe in block diagram form the type of hardware configurations that are desired to perform this function.

Figure 5:
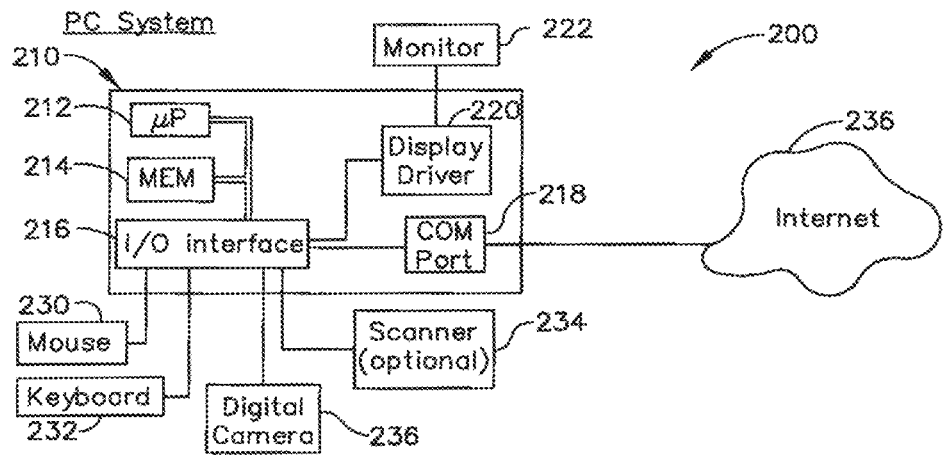
FIG. 5 is a block diagram of the major components of a personal computer system, as constructed and used according to the principles of the technology disclosed herein.

Referring now to FIG. 5, it is assumed that the person taking the photographs has a typical personal computer or a laptop computer system. This "PC" system is generally designated by the reference numeral 200, and includes both the computer and a digital camera. The computer is at reference numeral 210, and the digital camera is at reference numeral 236. In FIG. 5, this is a typical personal computer (or PC), and includes a microprocessor circuit 212, a memory circuit 214, an input/output interface circuit 216, a communications port 218, and a display driver circuit 220. Such PC computer systems need external peripherals, such as a monitor 222, a mouse 230, a keyboard 232, and perhaps a scanner 234. The scanner is optional, and would typically only be used if the photographer has a camera 236 but does not have any way of plugging the camera directly into the PC. In that situation, the photographer can print out his or her digital images, and then scan them into the PC 210, using the scanner 234.

In the PC system 200, the user can upload digital photographs using the communications port 218, which is connected to the Internet (which is generally designated by the reference numeral 236). The computer processing of those digital images will take place on other hardware, which is discussed below.

Figure 6:
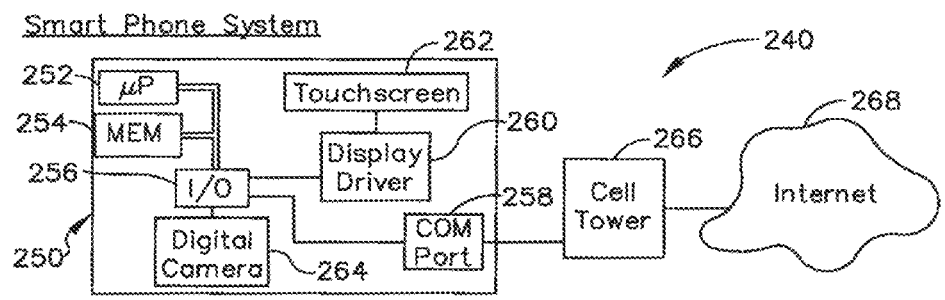
FIG. 6 is a block diagram of the major components of a smartphone system, as constructed and used according to the principles of the technology disclosed herein.

Referring now to FIG. 6, if the photographer has a smartphone rather than a digital camera, then a "smartphone system" can be used (which is generally designated by the reference numeral 240). The smartphone is at reference numeral 250, and includes a microprocessor circuit 252, a memory circuit 254, an input/output circuit 256, an internal digital camera 264, a communications port 258, a display driver 260, and a touchscreen display 262. As is well known in the art, the touchscreen display is also a data entry device, and will typically be used to enter commands using a virtual keypad that is part of the touchscreen display 262.

When the photographer is ready to upload his or her digital images, the communications port 258 will be actuated to contact a cellular tower 266. Once the smartphone has made a data connection to the cell tower 266, the digital images can be uploaded to a separate computer processing center, via the Internet 268. The computer processing will be performed by other hardware, as described below.

Figure 7:
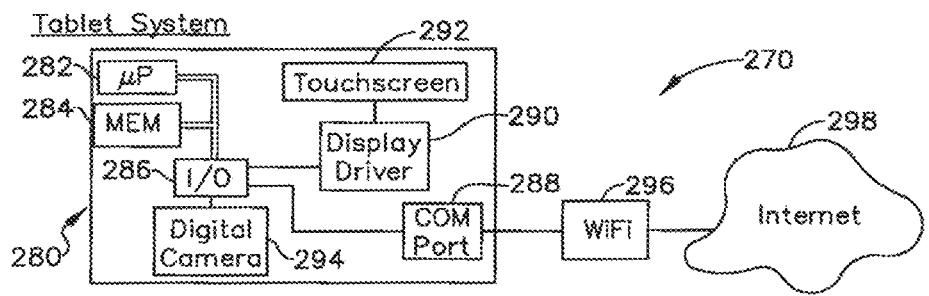
FIG. 7 is a block diagram of the major components of a tablet computer system, as constructed and used according to the principles of the technology disclosed herein.

Referring now to FIG. 7, the photographer could have a tablet-type computer, rather than a PC or a laptop, or rather than having a smartphone. In FIG. 7, the tablet system is generally designated by the reference numeral 270. System 270 includes a tablet computer 280, and there are several types of tablets available, including Androids, iPads and iPods, and the like. The tablet computer will contain a microprocessor circuit 282, a memory circuit 284, an input/output interface circuit 286, and in this instance, an internal digital camera 294. The tablet will also include a communications port 288, a display driver 290, and a touchscreen display 292. As was in the case of the smartphone, the touchscreen display 292 will also act as a data entry device, using a virtual keypad that appears on the display screen.

When the photographer is ready to upload his or her digital images, the tablet computer will actuate the communications port 288, so that communications port will become in communication with a Wi-Fi circuit 296. The Wi-Fi circuit is in communication with the Internet at 298, and the photographer will now be able to upload the digital images to a computer processing center, as discussed below.

As described above in reference to FIGS. 1-4, the digital image data must be manipulated to utilize the base calibration dimension and then to scale the room for the other wall and/or ceiling dimensions that are related to the base calibration dimension. These manipulations are done while viewing a computer monitor screen, and the computer program that performs these manipulations of the image data can be referred to as the "E4thD software."

The E4thD software can operate on at least three different potential platforms: an independent "processing center," a computer center at an insurance company, or a smaller computer that is operated by a claims representative. If there is an independent E4thD processing center, a block diagram showing the major hardware components of that type of system is provided on FIG. 8.

Figure 8:
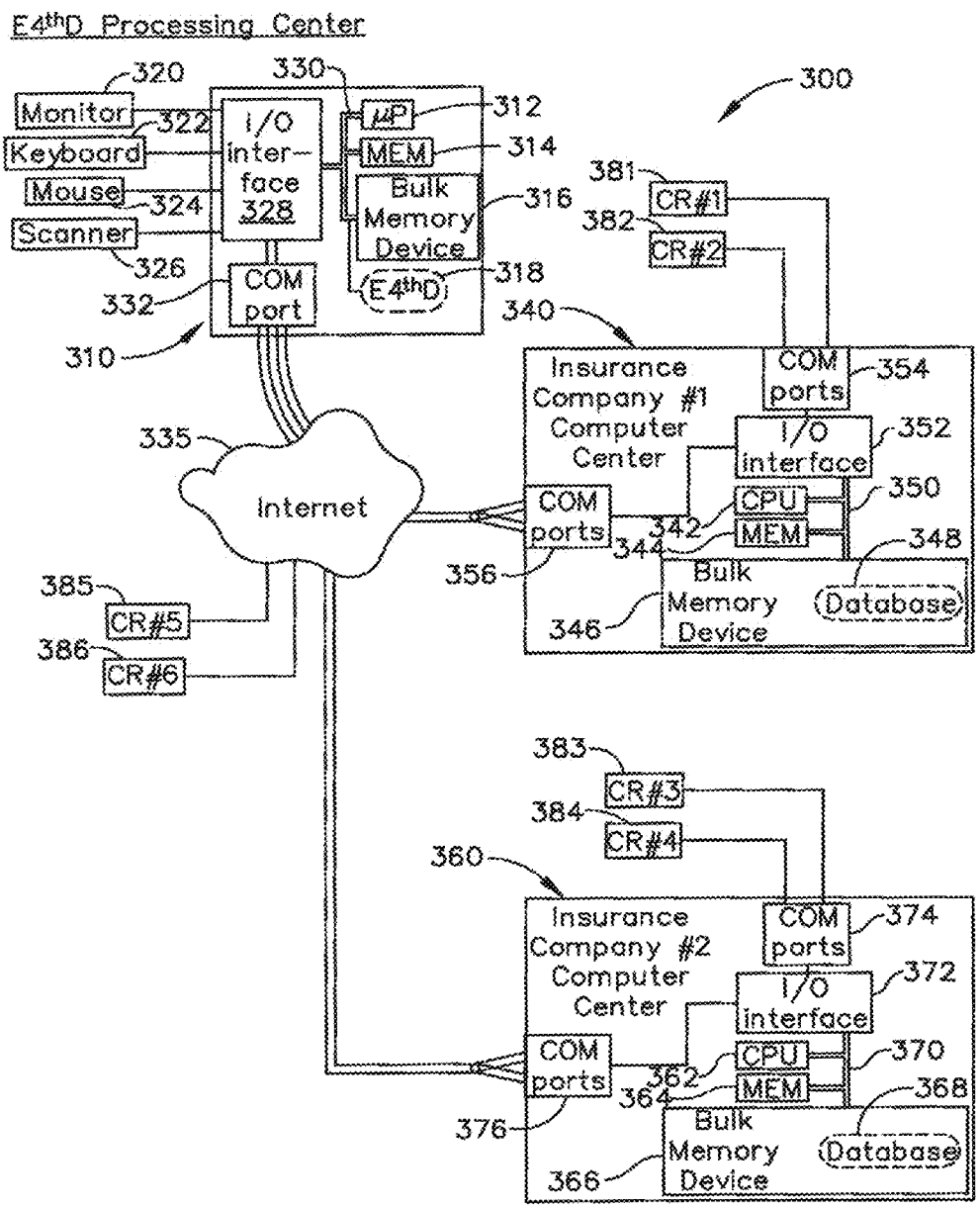
FIG. 8 is a block diagram of the major components of an E4thD processing center system, as constructed according to the principles of the technology disclosed herein.

On FIG. 8, the overall system is generally designated by the reference numeral 300, and includes some type of personal computer 310 as a workstation, at least one insurance company computer center, and a number of claims representatives (which will generally be referred to herein on the drawings as "CRs."). The processing center's computer 310 can be a relatively powerful personal computer, if that is sufficiently powerful for all the data that is to be manipulated. However, computer 310 must also act as the main web server for the E4thD processing center, so it should be capable of running online all day, every day. (Perhaps computer 310 would actually comprise a small network of two or more computers.)

In any event, such a computer will have a microprocessor circuit 312, a memory circuit 314, some type of bulk memory storage device 316, and it will contain the operating software referred to as the E4thD software, at 318. There will be an address and data bus 330 that communicates data between those components listed above, and also to an input/output interface circuit 328. Such a processing center computer will undoubtedly have peripherals, such as a monitor 320, keyboard 322, mouse 324, and a scanner 326 (in case the processing center receives hard copy photographs instead of digital data). The E4thD processing computer will also have a number of communication ports 332 that communicate to the Internet, generally designated at 335. If the E4thD processing center computing system handles a large amount of data, then there will also probably be separate servers to store and interface data to and from the Internet, although these servers are not shown on the drawing in system 300. The bulk memory device 316 will typically be a hard disk drive, or more likely several hard disk drives (possibly including web servers), but it could also be a more modern type of memory storage device, such as optical storage disks.

On FIG. 8, there are two different insurance company computer centers. The first one is designated by the reference numeral 340, and the second one is designated by the reference numeral 360. For the purposes of illustrating the technology system of FIG. 8, each of these insurance company computer centers will have substantially the same hardware components. For the first computer center 340, there will be a processing circuit 342, memory circuit 344, and bulk memory storage devices 346, which will store a database of insured properties, and that database is designated at 348. There will be an input/output interface circuit 352, and a common address/data bus 350 that transfers data to and from these major system components. The computer center 340 will need several communication ports, so there are ports at 352 that will communicate with claims representatives, designated at 381 and 382. Such claims representatives could be insurance company employees that work in the same building, for example, and might be connected via an internal "intranet." The communication ports designated at 356 are to communicate to the outside world, in general with the Internet at 335.

The second insurance company computer center 360 will likely have essentially the same components, including a processing circuit 362, memory circuit 364, and bulk memory storage devices 366 with a database of insured properties at 368. There will be an input/output interface circuit 372 and a data/address bus 370 that connects these major components so they can transfer data therebetween. The computer center 360 will also have many communication ports, including those at 374 that communicate with internal claims representatives at 383 and 384. Additional communication ports at 376 will communicate with the outside world, typically the Internet at 335.

The overall system 300 can also use independent claims representatives, which are generally designated at the reference numerals 385 and 386. These can be individuals that will work with one or more insurance companies, but are not necessarily employed directly by any one of those insurance companies. However, such persons will have access to the database files in one or more insurance company computer centers (i.e., at the database 348 or the database 368). Photographic images from insured persons can be sent to such independent claims representatives with damage reports and digital images of that damage. The type of computer system that the claims representatives 385 or 386 would require could be very similar to a standard personal computer or a laptop system, such as that designated by the reference numeral 200 on FIG. 5. These independent claims representatives could also be the very persons who travel to a damaged building site to take photographs, if needed, instead of relying on the insured person to take such photographs. Any combination of these events is possible in the system 300 of FIG. 8.

Figure 9:
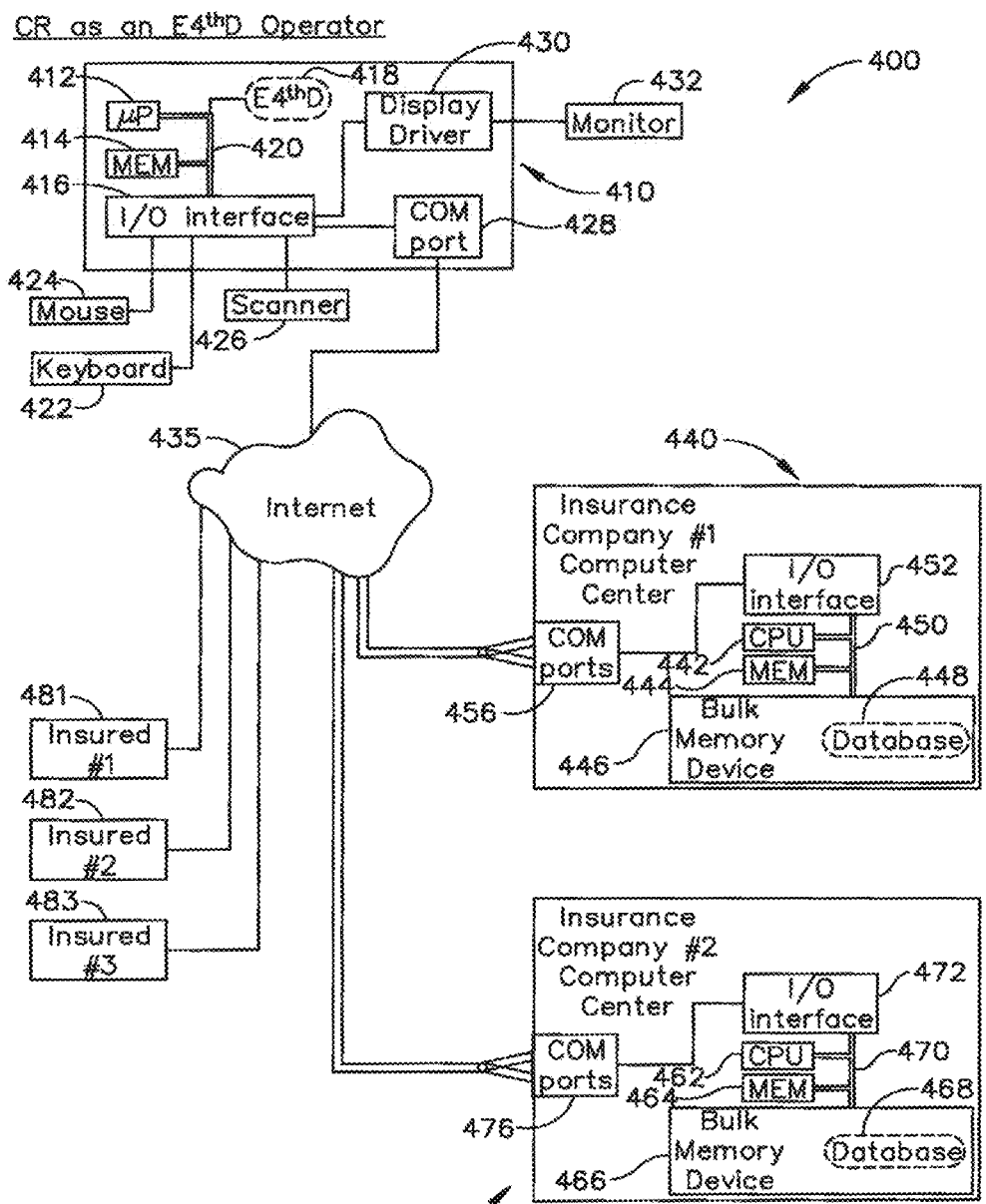
FIG. 9 is a block diagram of the major components of an E4thD system in which a claims representative is the E4thD operator, as constructed and used according to the principles of the technology disclosed herein.

Referring now to FIG. 9, an E4thD system that is generally designated by the reference numeral 400 is illustrated in block diagram form. As noted above, the E4thD operating software can run on a special processing center platform for the E4thD system, or it can run on an insurance company's computer center. Furthermore, it could be run on the computer of a claims representative, which is the system 400 that is illustrated on FIG. 9.

The claims representative has a computer 410, which could be a standard personal computer or a laptop computer, if desired. In any event, the computer 410 will include a processing circuit 412, a memory circuit 414, an input/output interface circuit 416, and operating software referred to as the "E4thD" system software at 418. There will be a data and address bus 420 that transfers data between these major system components. The computer 410 would also typically include a display driver circuit at 430 and a communications port at 428. The display driver 430 communicates with a monitor 432.

There will typically be the standard peripheral devices, such as a mouse 424, and a keyboard 422. If the computer 410 is a laptop, then the mouse and keyboard might be built into the laptop control panel itself, and those input devices could even be a virtual keyboard/mouse device on a touchpad. The E4thD operator as a claims representative also would likely have the optional scanner 426, in case an insured person sends hard copy photographs rather than digital image data.

The claims representative would typically receive digital image data over the Internet, which is generally designated by the reference numeral 435, communicating with the communications port 428. That data would typically come from an insured person who has had damage to their home or to their vehicle, for example. On FIG. 9, there are three different insured persons illustrated on the drawing, at 481, 482, and 483. All these people are communicating with the Internet at 435, and will transfer data to the claims representative computer 410.

The claims representative will also have access to at least one insurance company's computer center. On FIG. 9, two different insurance company computer centers are illustrated: a first one at 440, and a second one at 460. The first insurance company computer center includes a processing circuit at 442, a memory circuit 444, a bulk memory storage device 446, which will include a database 448. This database will contain the information about the insurance company's insured properties, typically including information about buildings (e.g., dwellings, stores, or office space), vehicles (such as automobiles, motorcycles, watercraft, aircraft, and construction equipment), and other expensive physical properties that are often insured.

The computer center 440 will also have an input/output interface circuit 452 and there will be an address/data bus 450 that communicates data between the main system components. The computer center 440 will also require several communication ports at 456, which receive and output data to and from the Internet 435. In practice, the data flow on FIG. 9 will be such that the individual insured person (such as the insured at 481) will contact the claims representative and send digital image data to that claims representative. Once the claims representative has that information, the claims representative will connect to the insurance company's computer center, such as the computer center at 440. The claims representative needs to access the database 448 so that the claims representative can obtain the property information about the insured's home or automobile property, and use that information while preparing a report that will ultimately become a formal submitted claim from the insured person 481 to the insurance company who owns the computer center 440.

The second insurance company computer center at 460 will have the same type of components and will operate in the same manner. For example, the second insurance company computer center includes a processing circuit at 462, a memory circuit 464, a bulk memory storage device 466, which will include a database 468. This database will contain the information about the insurance company's insured properties, typically including information about dwellings and vehicles (such as homes, automobiles, watercraft, and other expensive physical properties that are often insured).

The second computer center 460 will also have an input/output interface circuit 472 and there will be an address/data bus 470 that communicates data between the main system components. The computer center 460 will also require several communication ports at 476, which receive and output data to and from the Internet 435. In practice, the data flow on FIG. 9 will be such that the individual insured person (such as the insured at 481) will contact the claims representative and send digital image data to that claims representative. Once the claims representative has the necessary image information, the claims representative will connect to the insurance company's computer center, such as the second computer center at 460. The claims representative needs to access the database 468 so that the claims representative can obtain the property information about the insured's home or automobile property, and use that information while preparing a report that will ultimately become a formal submitted claim from the insured person 481 to the insurance company who owns the computer center 460.

Figure 10:
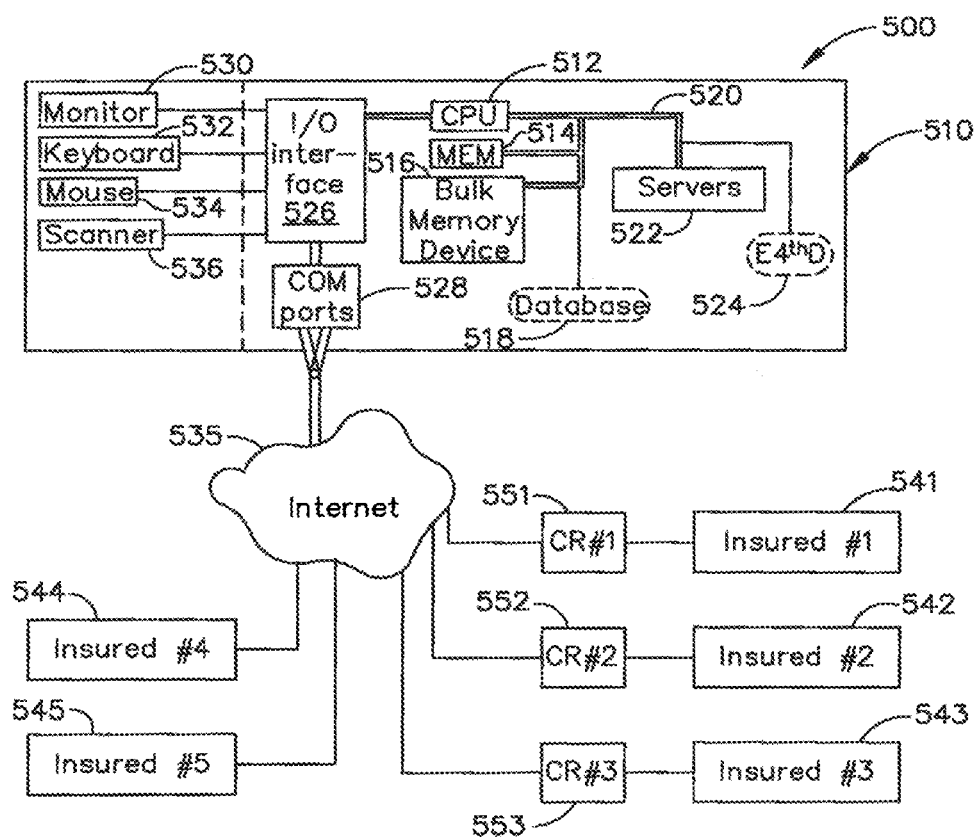
FIG. 10 is a block diagram of the major components of an insurance company's computer center, used as an E4thD operator system, as constructed and used according to the principles of the technology disclosed herein.

Referring now to FIG. 10, an E4thD system, generally designated by the reference numeral 500, is illustrated in which an insurance company will act as its own E4thD system operator. The insurance company will have its own computer center, generally designated by the reference numeral 510. This computer enter will include a database 518 that contains property information for its various customers, including dwelling properties and vehicle properties, for example. This computer center will also contain the E4thD operating software at 524. This would just be one of many types of operating software programs that run on the insurance company's computer center.

A typical computer center for an insurance company, such as the computer center 510, will include a processing circuit 512, a memory circuit 514, a bulk memory storage device 516, a data/address bus 520 that communicates data between the major system components, and several servers at 522. The processing circuit 512 will control the data flow that travels to and from an input/output interface circuit 526. This I/O circuit 526 will also communicate to several communications ports 528, which will ultimately communicate with the Internet at 535. The processing center 510 would also include several peripheral devices, such as a monitor 530, keyboard 532, mouse 534, and scanner 536. In reality, there will undoubtedly be many workstation computers spread throughout the insurance company's office space, each one of the workstations including all of these peripherals that can communicate through the I/O interface 526 to the main processing circuit 512.

The insurance company will have a large number of insured persons, and on FIG. 10, those persons are designated by the reference numerals 541, 542, 543, 544, and 545. In this example, the insured persons 544 and 545 communicate directly with the insurance company's processing center 510, via the internet at 535. An alternative routing is for the insured persons to communicate with a claims representative, who will act as an intermediary between the insured person and the insurance company. On FIG. 10, there are three claims representatives at 551, 552, and 553. Each of these claims representatives is dealing with one of the insured persons, at 541, 542, and 543, as illustrated on FIG. 10.

Figure 11:
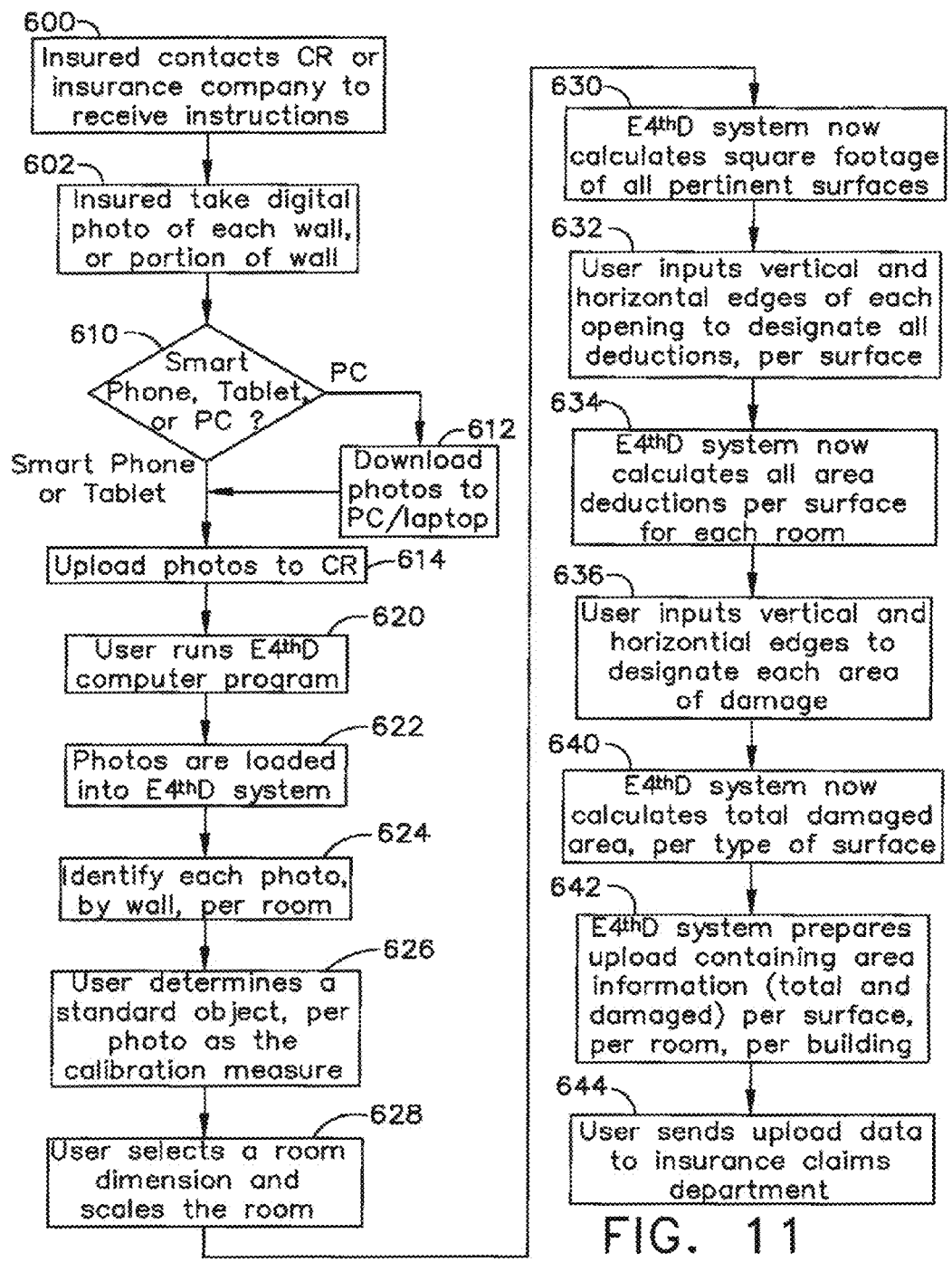
FIG. 11 is a flow chart of some of the important steps performed by persons who take photographs of damaged structures, and of steps performed by a user operating an E4thD operating system, as constructed and used according to the principles of the technology disclosed herein.

Referring now to FIG. 11, a flow chart is provided to show some of the major steps that would occur in a situation where an insured person has property damage to his or her home, and wishes to enter a claim to the insurance company. Beginning at a step 600, the insured person (typically referred to herein as the "insured") will contact either the insurance company or a claims representative to receive instructions. As discussed above in reference to FIGS. 8-10, the insured might work directly with the insurance company, or might work through a claims representative, either an insurance company's internally-employed claims representative, or perhaps an independent claims representative. The next step is numbered 602, in which the insured takes digital photographs of each wall or portion of wall of his or her home. The insured will receive instructions at step 600 to inform him or her as to exactly how these photographs should be taken. As a minimum, the insured must take photos of the damaged portions of the home.

A decision step 610 is now reached in the logic flow, and this is where it is determined whether the insured has a smartphone, a tablet computer, or a PC-style computer. If the answer is PC, then at a step 612, the insured downloads photographs from his or her digital camera to the PC (or laptop) computer. On the other hand, if the insured has either a smartphone or a tablet computer, then the logic flow is directed to a step 614. In either situation the logic flow arrives at step 614, which is where the insured uploads his or her digital images to a claims representative.

The claims representative will now be referred to as a "user," with regard to how the E4thD operating software will be operated. In reality, this user may not be a pure "claims representative" particularly if the user is a full-time employee of an insurance company. Such insurance companies will likely have specialized employees that run the E4thD computer software, and such people may or may not be considered to be claims representatives, per se. At a step 620, the user begins running the E4thD computer program. At a step 622, the digital images are loaded into the E4thD system by the user. Once the photos have been loaded into the E4thD computer system, each photograph now must be identified by wall, and per room of the home, at a step 624.

The user now begins running the special features in the E4thD operating software. At a step 626, the user determines a standard object per each photograph, to act as the calibration measure for that particular digital image. As discussed above, the measurement of a "standard object" could be the height or width of a specific building structure, such as a door or window, and the base calibration measure could be based upon dimensions specified by a local building code. Alternatively, the "standard object" could be a chair or other type of non-wall object, and the base calibration measure could be based upon dimensions that are well-known based on published information about those types of objects.

If the property being assessed for damage is a vehicle rather than a building, then the "standard object," for example, could be a window structure of an automobile. In this alternative example, the measurement of a "standard object" could be the height or width of a driver's side window of a specific automobile make and model, such as a 2014 Ford Mustang. In that circumstance, the base calibration measure could be based upon published information about a specific make and model of that type of vehicle, which is well-known information that is widely available, and would be quite standard information across an entire country, if not the entire world.

At this point in the procedure, the base calibration measure is strictly a near-vertical or near-horizontal line segment that has a starting point and a stopping point which will be identified by the user. Actually there will be two distance measures: the first one is the distance of the selected object in "engineering units," such as feet and inches, or in meters or centimeters—this is the well-known information that is either published in vehicle manuals or in building codes, for example. The second distance measure is the graphical distance on the monitor screen that is being viewed by the user. That graphical distance could be measured in a number of pixels of the image data, or could be based upon the graphical user interface (GUI) coordinates that are determined by the operating system of the E4thD processing computer being operated by the user.

In a preferred mode of the technology disclosed herein, the E4thD operating software uses the GUI coordinates to determine the graphical distance; that graphical distance will be referred to as being in terms of "GUIC units" (or merely "GUICs") in the following description. At this point in the processing, a ratio of "engineering units per GUIC" can be calculated for this particular image, and that ratio will be used soon thereafter.

At a step 628, the user selects a specific room (or other structural) dimension and now scales the room with respect to the calibration measure that was selected at step 626. More specifically, the user first will graphically select a pair of "ends," such as the overall height or width of the wall of a room that is depicted in the photographic image that is viewed on the monitor. These two ends will be considered the "end dimensions" of that aspect of the structure—i.e., the aspect would be the overall height dimension or the overall width dimension of that room. At this point in the procedure, the two end dimensions are defining a line segment having a distance dimension that is known (to the computer) only by the number of GUICs making up that line segment, in terms of the GUI coordinate system; that information will be used soon thereafter. Note that this example assumes that a building is the structure being assessed; similar steps would occur for a vehicle, such as an automobile, a boat, or an aircraft, for example, and the end dimensions would be selected accordingly.

Once the line segment has been defined by the user, the above ratio of "engineering units per GUIC" is now used as a conversion factor. For example, if the standard object was a door's height, and its true size is known to be 6 feet, 8 inches in engineering units, and if the length of the line segment of image data was 1472 GUICs on the monitor image, then the conversion factor would be approximately 54.348 inches per 1000 GUICs. (It will be understood that its inverse ratio of 18.4 GUICs per inch could instead be used, if desired.)

The second half of step 628 is to scale the room; every length, width, or height seen on the image can be converted from its number of GUICs into a number of inches. On FIG. 1, if the total height of the wall was about 1877 GUICs on the monitor screen, then the converted height for that dimension would become 102.01 inches in engineering units—about 8 feet, 6 inches. Note that this example is not precise in the least; it is based upon approximate measurements taken from patent drawings alone (and using an assumed GUI resolution per inch of display), not from a true digital photographic image.

The E4thD system now calculates the square footage of all pertinent surfaces at a step 630. If the entire wall's width was 3072 GUICs, for example, then that wall's total surface area would be calculated as 102.01 inches×166.956 inches, or about 17,031.23 square inches (i.e., 118.272 square feet). This quantity is the total wall area without any deductions for openings, as discussed below.

At this point, the E4thD system has determined all of the major dimensions for the individual rooms of the home that has been damaged, including the square footage of every wall and perhaps even the square footage of a ceiling or a floor, depending on whether or not those were also damaged areas. Now that this information has been gleaned, there must be certain "deductions" from the square footage surface area to allow for openings such as doors and windows. At a step 632, the user inputs vertical and horizontal edges of each opening to designate all of the deductions, per surface (per photograph image).

The E4thD system now calculates all area deductions per surface for each room, at a step 634. At a step 636, the user now inputs vertical and horizontal edges to designate each area of damage, and this is per wall or per floor/ceiling surface, per room. A given wall might have more than a single damaged area, so the user has the capability to designate more than one such area of damage. In one preferred embodiment, the boundaries for a damaged area are selected by use of perpendicular lines on an orthogonal set of axes on the visual monitor. The actual axes themselves do not need to be visible to the user, and in general, these axes will be approximately horizontal and vertical (i.e., essentially perpendicular to one another, hence defining an orthogonal set of coordinates). The damaged areas that are created by this function will use boundaries that are selected by the user, and those boundaries will typically be horizontal and vertical on the visual monitor. This is not an absolute criterion, but it is preferred for ease of use.

Each damaged area creates a set of "reduced dimensions" which are represented by those boundaries selected by user: each set of reduced dimensions represents one of the damaged area of the above wall, both for the horizontal and vertical distances of that damaged area (if using the orthogonal system of designating those boundaries, as discussed above). If there is only one damaged area on that wall, this set of reduced dimensions will derive that damaged area. If there are a plurality of damaged areas, each area will have its own set of reduced dimensions.

The E4thD system now calculates the total damaged area, per type of surface at a step 640. Every wall of every room will be able to have its own damage calculation. If the wall of FIG. 1 has 118.272 square feet, and its damaged area is about 50 square feet, then a ratio of "damage area/total area" can be calculated, which would be about 0.428 (or 42.8% damage) in this example. Every floor or ceiling surface will likewise be determined for their respective damage ratios. A total damage ratio for the entire structure can also be determined if that is desired. More likely, such "total" damage ratio will be categorized per type of structure; a horizontal ceiling would likely be more expensive to repair than a vertical wall, so keeping the ratio of damage for ceilings separate from the ratio of damage for walls probably makes more sense. The same is likely true for floor structures, and perhaps also for interior walls vs. exterior walls, etc.

At a step 642, the E4thD system now prepares an upload that contains the area information per surface, per room, and per building. This area information includes both the total area of each surface, and the amount of damaged area for each of those surfaces. (This will allow the insurance company to quickly see the extent of the damage, as a percentage of "damage area" per original "total surface area" of each of the surfaces.) The user now sends the uploaded data to the insurance company claims department, at a step 644.

It will be understood that a customer of an insurance company who has sustained property damage might want to ask for a "pre-claim" estimate, instead of jumping immediately into the insurance company's claim procedure. Therefore, an "estimator" could instead be used for the initial stages of the procedures discussed above, instead of using an insurance company's "claims representative" or "claims adjustor." This is an important feature of the present technology, because a very large percentage of insurance claims that are presented to insurance companies do not even reach the deductible amount in actual property damage. In such situations, the person insured will often be "penalized" by the insurance company for entering a claim, even though that insured person ultimately receives absolutely no monetary benefit as a result of that claim, because the property damage was relatively insignificant and was less than the deductible amount of that person's insurance policy.

And, if an "independent claims representative" is involved in the initial stages of dealing with a customer of an insurance company who has sustained property damage, that customer could ask the claims representative for an estimate for repairing the damage before that claims representative actually begins the process of entering a claim to the insurance company. In that situation, the claims representative could either create the pre-claim estimate, or could turn that request over to an "estimator" working in the same office.

Using the technology disclosed herein, the insured person can upload digital photographs to the estimator or independent claims representative and receive a cost estimate for repairing the damage, thereby determining whether or not it is really worth filing an actual claim to the insurance company. And since it is very easily and quickly performed using the technology disclosed herein, creating the cost estimate by the estimator/claims representative will consume very little of that person's time to prepare such cost estimate for the insured person.

Figure 12:
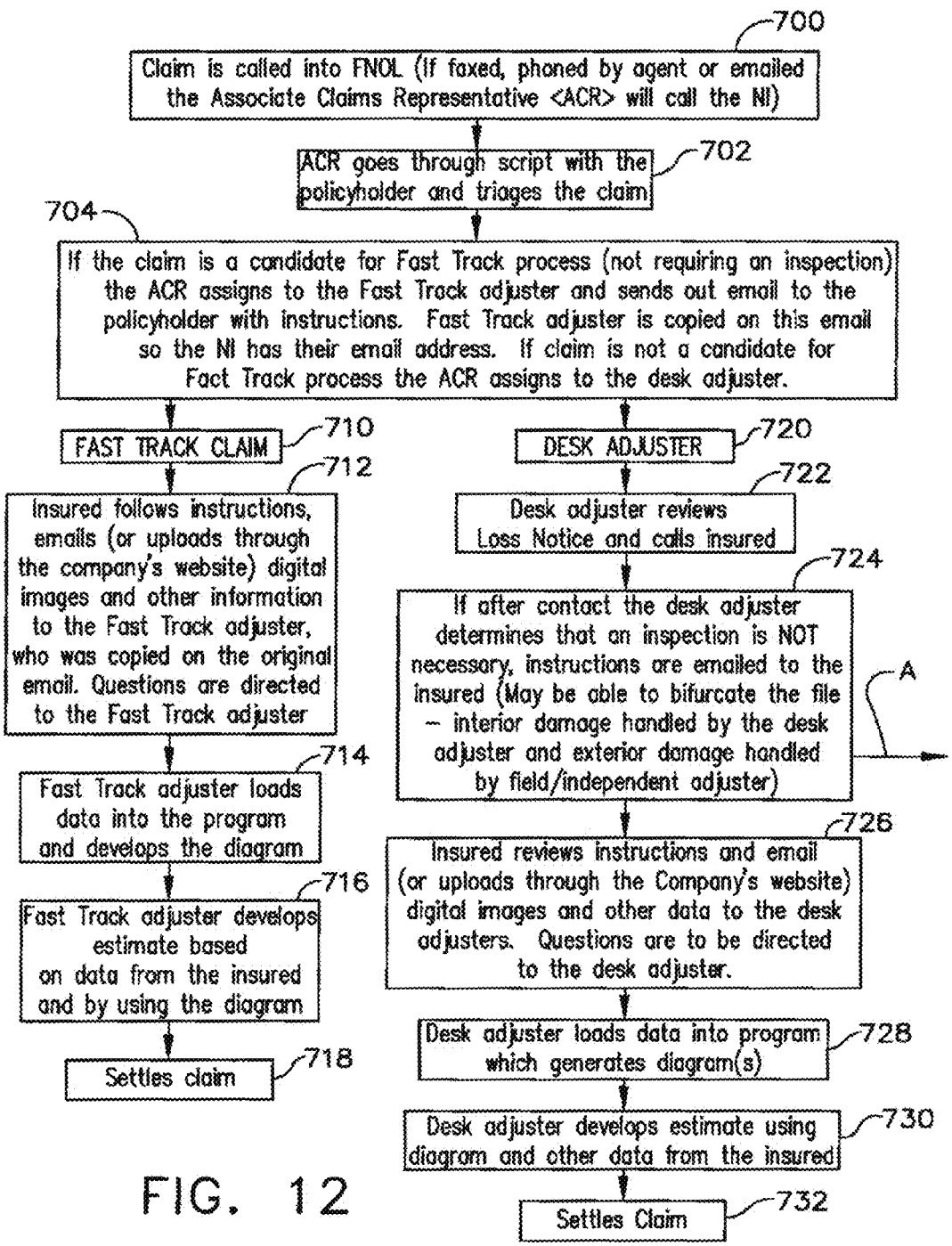
FIGS. 12 and 13 combined are a flow chart showing some of the important steps for entering a claim to an insurance company for property damage as performed by insured persons entering a fast track claim, or by desk adjusters or field adjusters, according to the principles of the technology disclosed herein.
Figure 13:
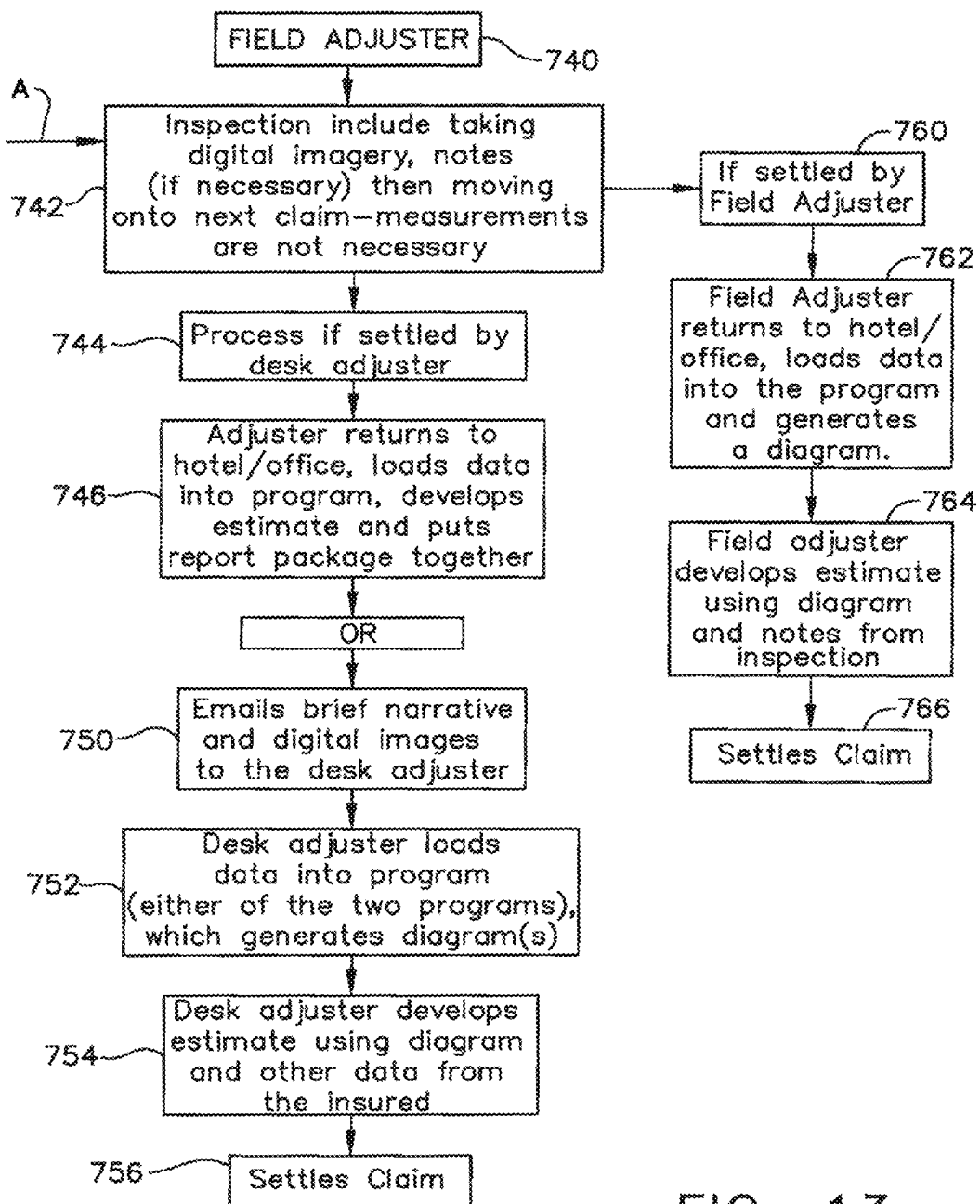

Referring now to FIGS. 12 and 13, a flow chart is provided showing some of the important steps performed when entering a claim to an insurance company for property damage using the technology disclosed herein. The claim procedure for insured persons can have alternative pathways, such as a "fast track claim," or perhaps a track performed by desk adjusters or field adjusters, depending on the types and extent of the property damage. Beginning at a step 700, a potential claim is called into a field office and a claims representative (or an "associate claims representative, or "ACR") will begin the process. In this description, the ACR acronym is used, and it will be understood that such a person can be the equivalent of a claims representative or other type of person, regardless of their exact title or job position.

At a step 702 the ACR discusses the procedure for using the E4thD system and learns more about the property that has been damaged. Once certain minimum information has been learned by the ACR, the ACR determines whether the claim is a candidate for "fast track" processing, at a decision step 704. If so, the logic flow is directed to a step 710; if not it is directed to a step 720.

At step 710, the procedure enters the fast track processing. The insured person follows instructions and takes photographs of the damaged property at a step 712. These photographs, if digital image data, are uploaded to a fast track adjuster. The fast track adjuster loads the information received from the insured person into the E4thD processing computer at a step 714, and develops a diagram of the damaged property. The fast track adjuster uses that diagram to prepare an estimate for repairing the damaged property at a step 716. If this estimate is accepted by the insured person, the claim is settled at a step 718.

If fast track processing is not used, then a "desk adjuster" is brought into the process at step 720. The desk adjuster discusses the potential claim with the insured person at a step 722. If the desk adjuster determines that an inspection is not necessary, at a decision step 724, then the desk adjuster sends instructions to the insured person to make photographs of the damaged property. The insured person takes the required photographs and uploads them to the desk adjuster, at a step 726.

The desk adjuster loads the information received from the insured person into the E4thD processing computer at a step 728, and develops a diagram of the damaged property. The desk adjuster uses that diagram to prepare an estimate for repairing the damaged property at a step 730. If this estimate is accepted by the insured person, the claim is settled at a step 732.

If the desk adjuster determines that an inspection is necessary, at decision step 724, then the desk adjuster contacts a "field adjuster" (see step 740) to make an on-site inspection of the damaged property. The logic flow is directed along arrow "A" from FIG. 12 to FIG. 13. The field inspector takes photographs, as per the instructions for using the E4thD system, at a step 742. The claims processing can now be handled either by a desk adjustor or a field adjuster.

If handled by a desk adjuster at step 744, the desk adjuster develops the estimate using the E4thD processing software at a step 746. Or, in the alternative, the field adjuster e-mails the images to a desk adjuster at a step 750. The desk adjuster then loads the information received from the field agent into the E4thD processing computer at a step 752, and develops a diagram of the damaged property. The desk adjuster uses that diagram to prepare an estimate for repairing the damaged property at a step 754. If this estimate is accepted by the insured person, the claim is settled at a step 756.

If handled by the field adjuster at a step 760, the field adjuster loads the information made during the on-site inspection into the E4thD processing computer at a step 762, and develops a diagram of the damaged property. The field adjuster uses that diagram to prepare an estimate for repairing the damaged property at a step 764. If this estimate is accepted by the insured person, the claim is settled at a step 766.

Figure 14:
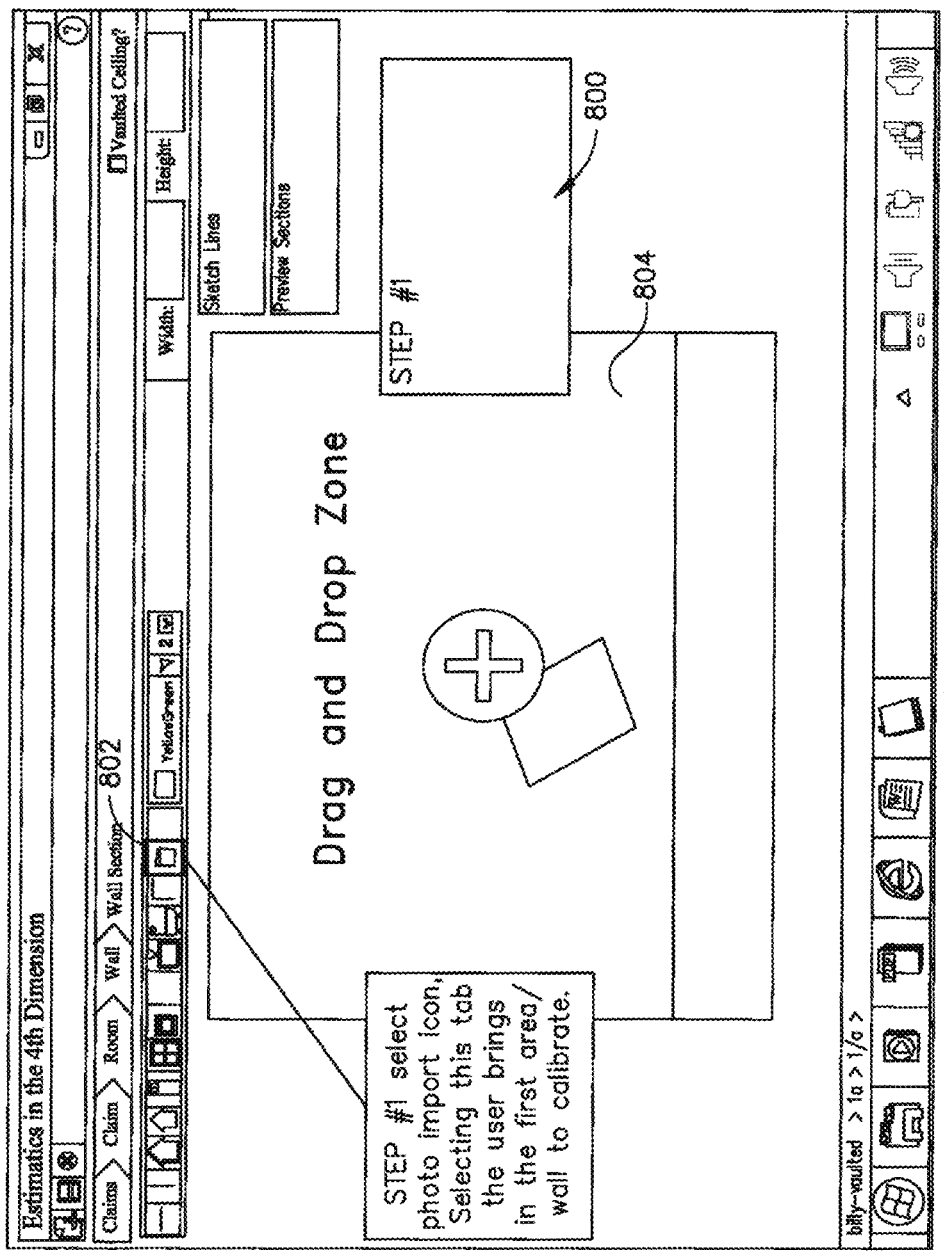
FIG. 14 depicts a computer-generated visual display, showing an initial step for developing a scale diagram of a structure, using a second embodiment of the technology disclosed herein.

Referring now to FIGS. 14-19, a second embodiment of a procedure for developing images into a floor plan of the type that is useful for making damage assessments is illustrated. In FIG. 14, an initial display is provided to the user of the E4thD operating software for use in selecting a particular image data file that has been uploaded to the E4thD computer system (such as a computer system 310, 410, or 510). The user is graphically told to begin "step 1" at a box 800 by clicking on a "photo import" icon 802 that appears in a horizontal button bar, near the top of the display. Once the image data file of interest is selected, that image will appear in the display window in the area 804 on this monitor's display screen.

Figure 15:
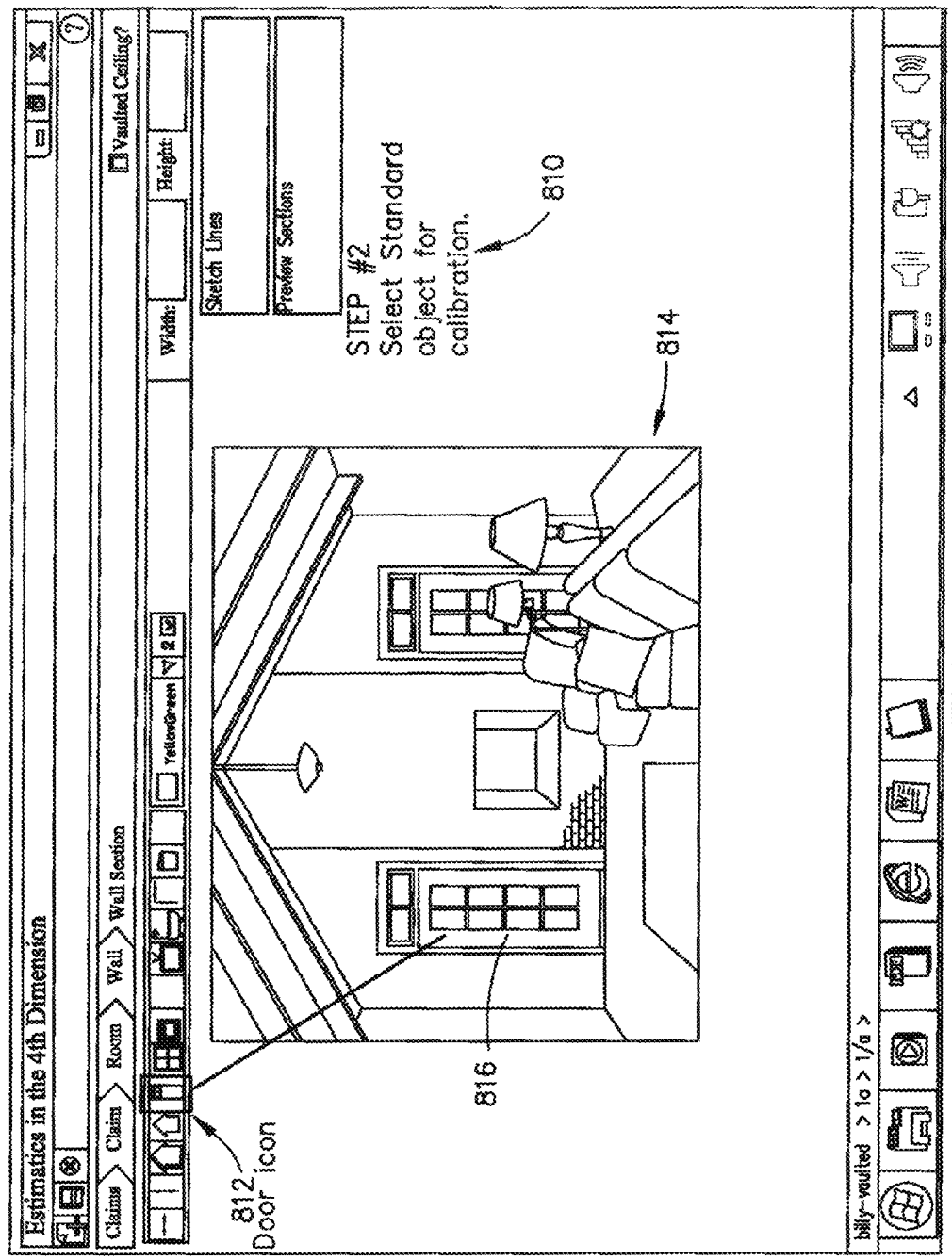
FIG. 15 depicts a computer-generated visual display, showing a perspective view of an internal space of a structure that can be diagrammed using computer software-controlled graphical techniques that are implemented by the second embodiment of the technology disclosed herein.

In FIG. 15, a "step 2" is indicated at 810, and the user is instructed to now select a "standard object" for use in the calibration procedure. In this example, the user clicks on a "door" icon at 812, which informs the operating software that the standard object will be some type of door structure. The image that was selected in FIG. 14 will be visible at 814. The user can now select one of this door's major (outline) dimensions for use in the calibration procedure. In this example, the user points the graphical pointer (e.g., using a mouse or other cursor-type pointing function) to the left-hand door in this view of FIG. 15, which informs the E4thD operating software that this is the door that will be used in the next step of the procedure.

Figure 16:
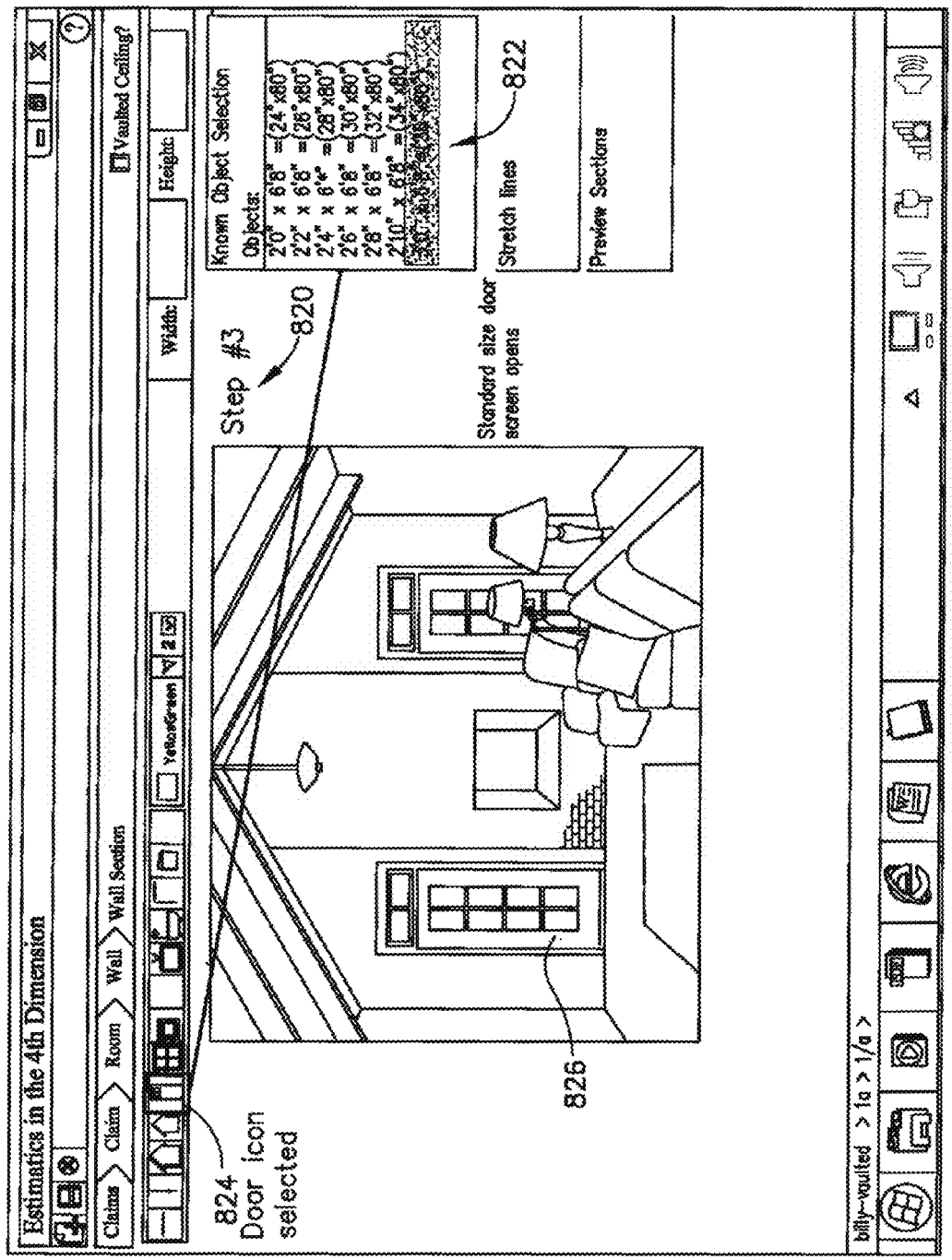
FIG. 16 depicts the visual display of FIG. 15, showing a standard object being selected for use in calibration.

In FIG. 16, a "step 3" is indicated at 820, showing the user that a door icon had been selected at the previous step (see FIG. 15). A "menu box" appears at 822, showing the user a list of possible choices for standard door sizes. This menu box is automatically displayed by the E4thD operating software after the user selected the "door" icon at 824. (This is the same door icon that was seen at 812, in FIG. 15.) The user now selects one of the doors in the image (e.g., the left-hand door at 826), to graphically inform the software exactly which door structure has been selected for the next step in the procedure.

Figure 17:
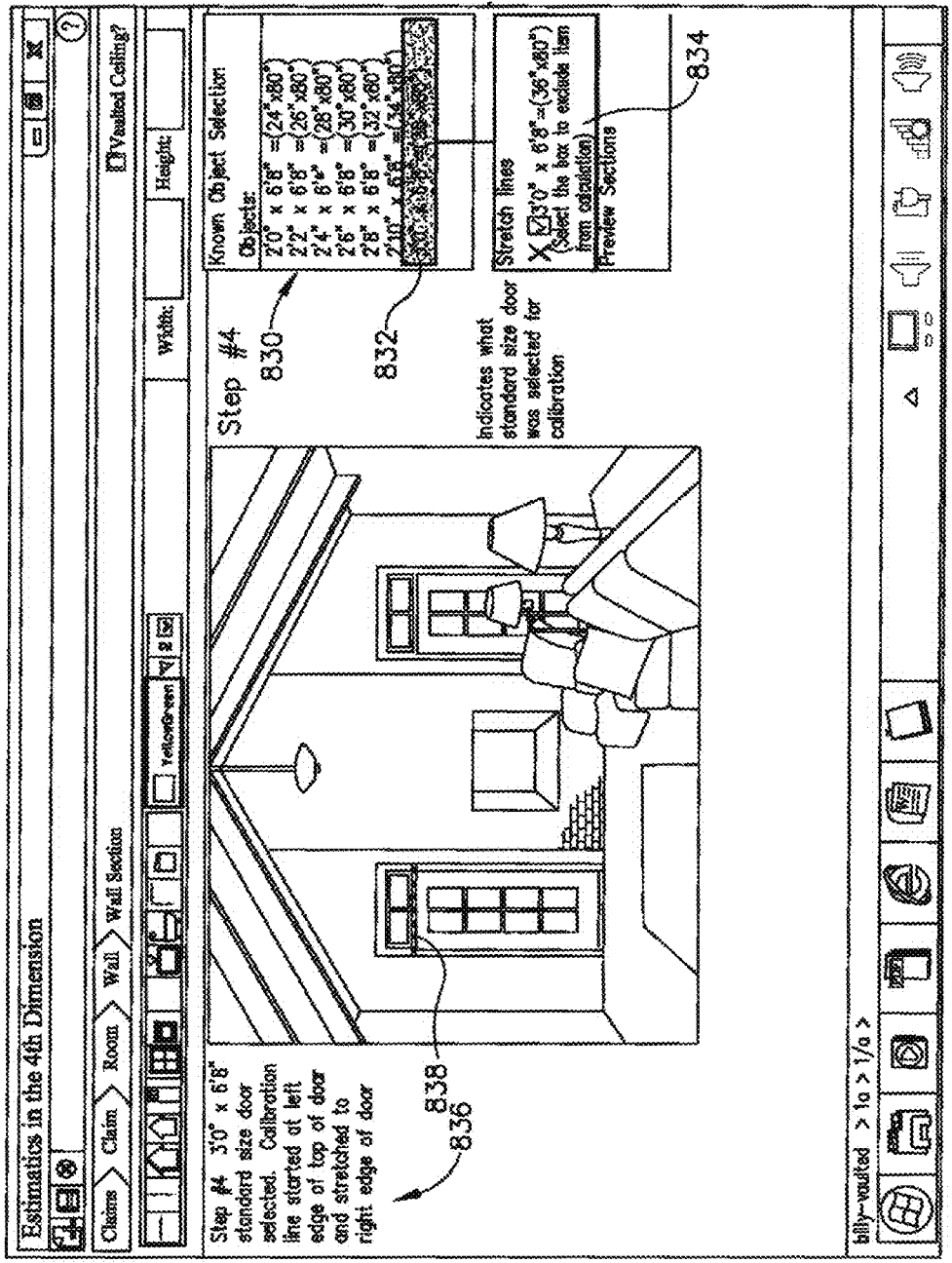
FIG. 17 depicts the visual display of FIG. 16, showing the exact size of the standard object being selected for use in calibration.

In FIG. 17, a "step 4" is indicated at 836. The user was provided with a menu box 822 in the previous step; that menu box is now generally designated by the reference numeral 830 in FIG. 17. In this example, the user points the graphical pointer (e.g., using a mouse or other cursor-type pointing device) to one of the dimension choices at 832, and the computer monitor now displays a box at 834 to inform the user of his/her dimension choice—which was a door dimension of 3'0"×6'8" (or 36"×80"). The step 4 area at 836 indicates this set of width and height dimensions, and informs the user that a calibration line should now be made from the left edge to the right edge, along the top of the door (from one upper corner to the other upper corner of the door's outer perimeter).

The left-hand door is still visible on the viewable image data, and a colored near-horizontal line (or bar) appears at 838, along the top edge of that door in the image. In general, the user will "click and drag" to create this colored line; in other words, the user will point to the upper left-hand corner of the door and "click" the mouse (pointer) at that position on the image. Then the user will "drag" the colored line over to the upper right-hand corner of the same door, where the mouse is released. This places the colored line (or bar) at the precise positions on the image where the width of the door is viewable on the user's monitor. The E4thD operating software will now use that door's width dimension in the next step of the procedure.

Figure 18:
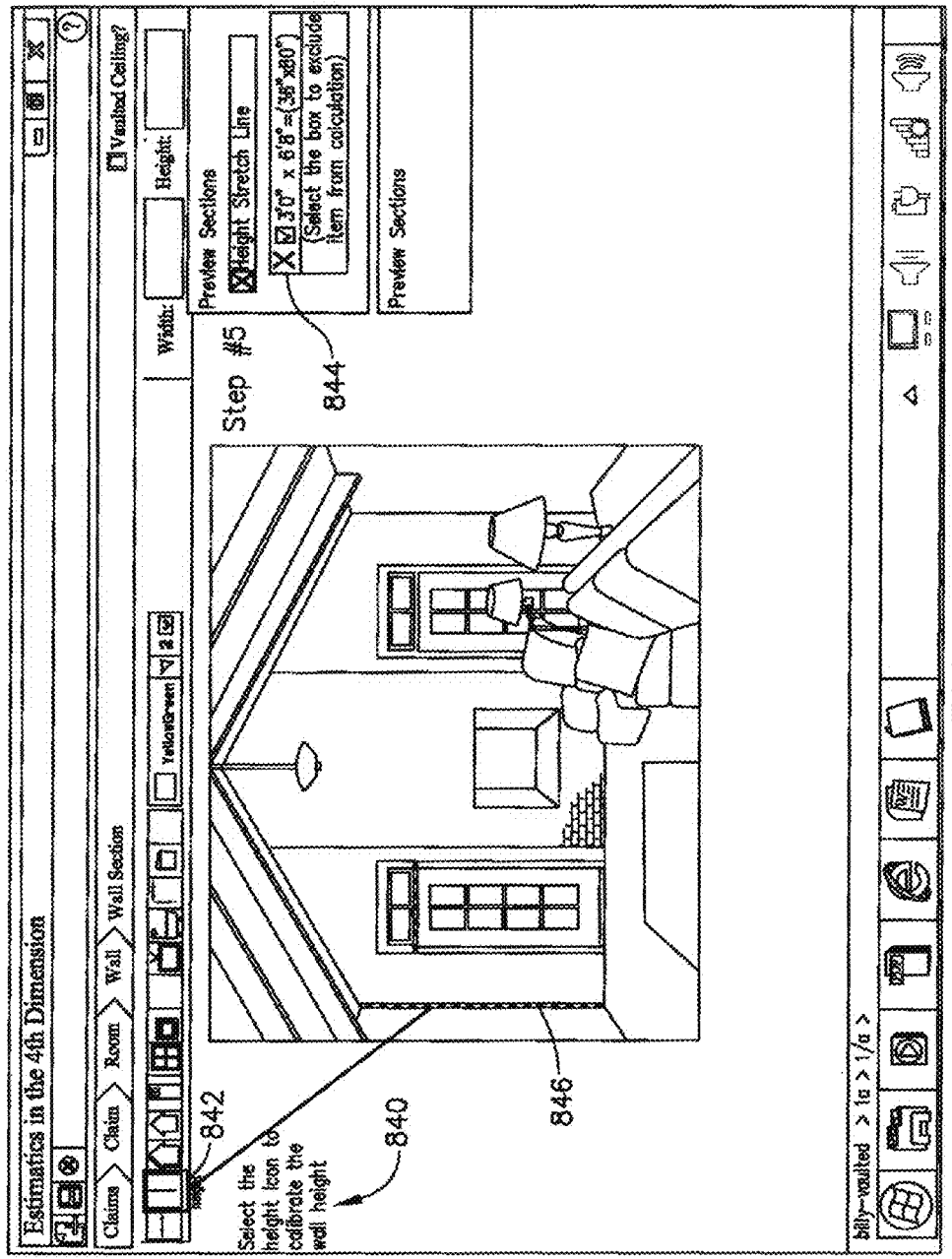
FIG. 18 depicts the visual display of FIG. 17, showing a height dimension now being selected for conversion into engineering units.

In FIG. 18, a "step 5" is next, which is indicated by the instructions at 840 telling the user to select either a "width icon" or a "height icon" that will now be used to calibrate the dimensions of the room's wall that is seen in the displayed room's image. In this example, the user selects a vertical icon (i.e., the "height icon") at 842, which means that the user will next indicate something in the image data that corresponds to the height of the wall in the image data. A stretch box for "height" is shown at 844, indicating that the door's width had already been selected as the calibration measure, using FIG. 17. The user should now click and drag the dimension of interest; in FIG. 18, that dimension is the height along the left-hand corner of the room in the image, which becomes a colored line 846. As before, the user will move the pointing device (e.g., a mouse) to either the top or bottom corner and click; and then drag the line to the opposite corner (bottom or top), and release. This creates the colored line 846 at the precise positions on the image where the walls create that left-hand corner, from floor to ceiling.

Figure 19:
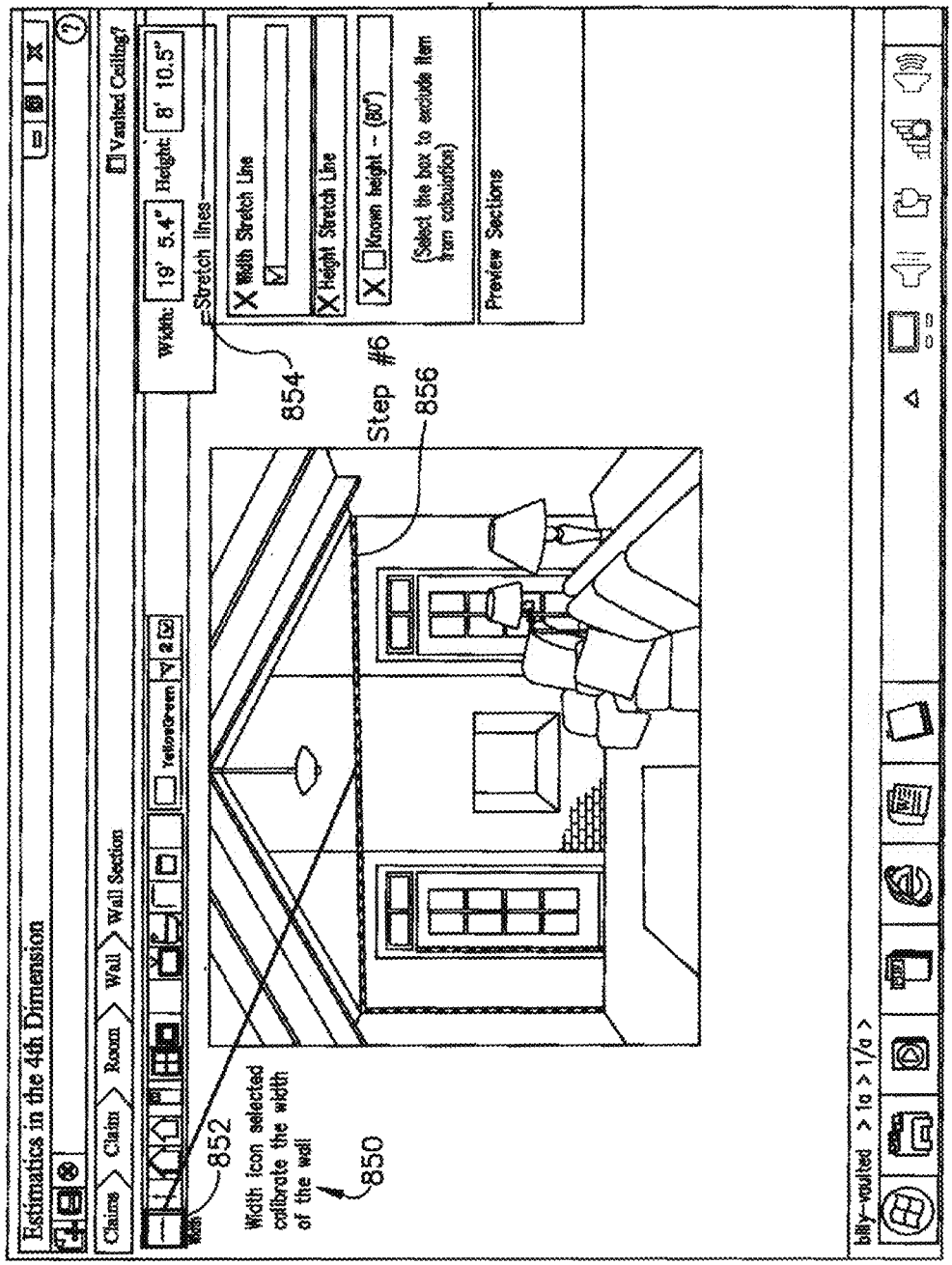
FIG. 19 depicts the visual display of FIG. 17, showing a width dimension now being selected for conversion into engineering units.

In FIG. 19, a "step 6" is next, which is indicated by the instructions at 850 telling the user that the "width icon" is being selected at 852. The user should now click and drag the dimension of interest; in FIG. 19, that dimension is the width along the top two corners of the room in the image, which becomes a colored line 856. This line position is determined by the user, who clicks and drags the precise positions of the starting and stopping points (at the room corners) of the line 856 on the image. At this point in the calibration procedure, the operating software knows the "image length" of the room's height (at line 846 on FIG. 18) and the "image length" of the room's width (at line 856 on FIG. 19); this image length information is in units of the graphic user interface (GUI), by virtue of the user "pointing" his or her cursor (the mouse, for example) at the precise starting and stopping points on the image, when creating those two lines.

Now that both a height and a width dimension have been selected by the user, and E4thD operating software can scale the room by calibration information that started with the "standard object" selection at 838 on FIG. 17. The conversion factor between GUI distances and actual distances in engineering units (such as feet, inches, meters, cm, etc.) can be calculated, and the "image lengths" can be readily converted into one of those actual distances. A pop-up box at 854 now appears on FIG. 19, and shows the actual distances in engineering units; in this example, the actual width turned out to be 20' 1.8" and the actual height turned out to be 9' 1.5", using feet and inches as the engineering units for the resulting scale diagram.

All other points on the image data, which initially were only known in units of GUI coordinates, can now be easily calculated into engineering units. This allows the user to select horizontal and vertical lines to create squares or rectangles (which might represent damage areas, or deductions, as discussed above) and the actual areas of those squares and rectangles can be readily calculated in engineering units.

It will be understood that the example displays used in FIGS. 14-19 are representative of only one type of structure that could be the subject of an E4thD calibration analysis and development of image data into actual dimensions. Other types of structures could instead be analyzed, such as vehicles, or other types of buildings that do not have doors, for example. Also, it should be noted that units of pixel data could be used instead of GUI units of distance, if that is desired from a software system designer's standpoint. This concept is probably more dependent upon the type of graphical software that controls the E4thD computer system, such as Windows, or Macintosh, or UNIX, for example.

It will also be understood that the logical operations described in relation to the flow charts of FIGS. 11-13 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 252) to execute software instructions that are stored in memory cells within an ASIC. In fact, the entire microprocessor 252, along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented.

It will be further understood that the precise logical operations depicted in the flow charts of FIGS. 11-13, and discussed above, could be somewhat modified to perform similar, although not exact, functions without departing from the principles of the technology disclosed herein. The exact nature of some of the decision steps and other commands in these flow charts are directed toward specific types of operating computers, workstations, or large computer centers available today, and certainly similar, but somewhat different, steps would be taken for use with other models of computer systems in many instances, with the overall inventive results being the same.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together (such as for a smart phone. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A computerized system for determining physical attributes of a physical structure, said system comprising:
   a. a first computerized device, comprising:
      (i) a first processing circuit;
      (ii) a first memory circuit;
      (iii) a first communications circuit;
      (iv) a first display device;
      (v) a first user-controlled data entry device;
      (vi) at least one of: (A) a single camera, and (B) a single optical scanner;
      (vii) a first computer program that executes on said first processing circuit;
   b. a second computerized device, comprising:
      (i) a second processing circuit;
      (ii) a second memory circuit;
      (iii) a second communications circuit;
      (iv) a second display device;
      (v) a second user-controlled data entry device;
      (vi) a second computer program that executes on said second processing circuit;
   c. a third computerized device, comprising:
      (i) a third processing circuit;
      (ii) a third memory circuit, wherein said third memory circuit further comprises a database of insured property information that is maintained by an insurance company;
      (iii) a third communications circuit;
      (iv) a third display device;
      (v) a third user-controlled data entry device;
      (vi) a third computer program that executes on said third processing circuit;
   d. at least one communications network connecting said first, second, and third communications circuits of said first, second, and third computerized devices, that allows said first, second, and third communications circuits to transfer data to and from external computer devices;
   wherein:
   e. said first processing circuit, executing said first computer program, is configured:
      (i) to cause image data depicting at least a portion of said physical structure received at said first communications circuit, from said at least one of a single camera and a single scanner, under control of a first user, to be stored in said first memory circuit;
      (ii) to transmit said image data, using said first communications circuit, to said second computerized device;
   f. said second processing circuit, executing said second computer program, is configured:
      (i) to cause said image data received at said second communications circuit, from said first computerized device, to be stored in said second memory circuit;
      (ii) to allow a second user to select first and second areas from said image data, wherein said second user uses said second processing circuit:
         (A) to view said image data on said second display device;
         (B) to graphically draw a first line that corresponds to a particular dimension of an object, as selected by said second user, that appears in said image data, and thereafter use said first line as a base calibration measure;
         (C) to store said base calibration measure in said second memory circuit;
         (D) to graphically draw a second line having a second distance as its length, said second distance spanning a different particular dimension on said image data, as selected by said second user;
         (E) to assign an actual distance in engineering units to said base calibration measure, and to convert said second distance that initially was in terms of units of GUI coordinate data into a distance that is in terms of engineering units;
         (F) to automatically scale said entire image, in units of GUI coordinate data, into engineering units, and thereby create a scale diagram;
         (G) to select a first area that corresponds to a total area of a specific structure that appears in said image, using said second user-controlled data entry device;
         (H) to select a second area that corresponds to at least one area of damage that is visible in said image, using said second user-controlled data entry device;
      (iii) to calculate said first area in terms of engineering units, to calculate said second area in terms of engineering units, and to store results of said first area and second area calculations;
      (iv) to transmit said results, using said second communications circuit, to said third computerized device; and
   e. said third processing circuit, executing said third computer program, is configured:
      (i) to cause said results received at said third communications circuit, from said second computerized device, to be stored in third second memory circuit;

(ii) to allow a third user to assess a damage value of said at least one area of damage, wherein said third user uses said third processing circuit:
  (A) to review said results to identify an insured property;
  (B) to inspect information about said insured property that is stored in said third memory circuit, to determine a value of said insured property; and
  (C) to use said damage value to prepare a proposal for settling a property damage claim by said first use.

2. The system of claim 1, wherein: said third user transmits said proposal to at least one of said first user and said second user, using said third communications circuit.

* * * * *